(12) United States Patent
Mineikis et al.

(10) Patent No.: US 12,273,323 B2
(45) Date of Patent: Apr. 8, 2025

(54) PING-BASED SELECTION OF PRIVATE NETWORK SERVERS

(71) Applicant: UAB 360 IT, Vilnius (LT)

(72) Inventors: Karolis Mineikis, Vilnius (LT); Ugnius Naujokas, Vilnius (LT)

(73) Assignee: UAB 360 IT, Vilnius (LT)

( * ) Notice: Subject to any disclaimer, the term of this patent is extended or adjusted under 35 U.S.C. 154(b) by 265 days.

(21) Appl. No.: 17/679,914

(22) Filed: Feb. 24, 2022

(65) Prior Publication Data
US 2023/0269231 A1    Aug. 24, 2023

(51) Int. Cl.
*H04L 9/40*    (2022.01)
*H04L 43/0864*    (2022.01)

(52) U.S. Cl.
CPC ...... *H04L 63/0272* (2013.01); *H04L 43/0864* (2013.01); *H04L 63/029* (2013.01)

(58) Field of Classification Search
CPC ........................ H04L 63/0272; H04L 43/0864; H04L 63/029
See application file for complete search history.

(56) References Cited

U.S. PATENT DOCUMENTS

| | | | |
|---|---|---|---|
| 9,177,153 B1 | 11/2015 | Perrig et al. | |
| 9,438,564 B1 | 9/2016 | Weng et al. | |
| 10,440,058 B2 | 10/2019 | Chen | |
| 10,992,670 B1 | 4/2021 | Drooger et al. | |
| 11,196,719 B1* | 12/2021 | Nedzinskas | H04L 63/0272 |
| 11,234,204 B2 | 1/2022 | Ding et al. | |
| 2012/0071244 A1 | 3/2012 | Gillo et al. | |
| 2013/0205025 A1* | 8/2013 | Shamsee | H04L 45/12 709/225 |
| 2014/0137188 A1 | 5/2014 | Bartholomay et al. | |
| 2015/0058448 A1 | 2/2015 | Proctor | |
| 2015/0229661 A1 | 8/2015 | Balabine et al. | |
| 2015/0235015 A1 | 8/2015 | Holler et al. | |
| 2015/0375113 A1 | 12/2015 | Justice et al. | |
| 2017/0005865 A1 | 1/2017 | Liu et al. | |
| 2018/0309834 A1 | 10/2018 | Nitta et al. | |
| 2018/0367953 A1 | 12/2018 | Shimizu et al. | |
| 2019/0108168 A1 | 4/2019 | Burns et al. | |
| 2019/0132291 A1 | 5/2019 | Zhao et al. | |
| 2020/0067841 A1 | 2/2020 | Miu et al. | |
| 2021/0075853 A1 | 3/2021 | Banerjee et al. | |
| 2021/0234728 A1 | 7/2021 | Cidon et al. | |
| 2021/0266336 A1 | 9/2021 | Diaz-Cuellar et al. | |
| 2021/0273913 A1 | 9/2021 | Bosch et al. | |
| 2021/0392075 A1 | 12/2021 | Alashkin et al. | |
| 2021/0405962 A1 | 12/2021 | Mackay et al. | |
| 2022/0027431 A1 | 1/2022 | Zheng et al. | |

(Continued)

*Primary Examiner* — Bryan Y Lee
(74) *Attorney, Agent, or Firm* — Young Basile Hanlon & MacFarlane, P.C.

(57) ABSTRACT

An intended network usage is received. An association between the intended network usage and a virtual private network (VPN) server is retrieved. Responsive to determining not to use the VPN server, a new VPN server is obtained from a central server. An encrypted tunnel is established with the new VPN server. An association is stored between the new VPN server and the intended network usage. A communication directed to a network server is encrypted to obtain an encrypted communication. The encrypted communication is transmitted via the encrypted tunnel.

20 Claims, 9 Drawing Sheets

(56) References Cited

U.S. PATENT DOCUMENTS

| | | |
|---|---|---|
| 2022/0029974 A1 | 1/2022 | Manser et al. |
| 2022/0141190 A1* | 5/2022 | Olson ................. H04L 63/0272 726/15 |
| 2022/0278874 A1* | 9/2022 | Gabay ................. H04L 63/1441 |
| 2022/0321600 A1 | 10/2022 | Celiesius |

* cited by examiner

PING-BASED SELECTION OF PRIVATE NETWORK SERVERS

TECHNICAL FIELD

The present disclosure relates generally to virtual private networks (VPN), and more particularly to identifying one or more VPN servers for a user device.

BACKGROUND

Global Internet users increasingly rely on virtual private network (VPN) services to preserve their privacy and access geo filtered content. Originally developed as a technology to privately send and receive data across public networks, VPNs are now used broadly as a privacy-preserving technology that allows Internet users to obscure their traffic and their personal information, such as their web browsing history, from third parties including Internet service providers (ISPs), Spywares, and other third parties. A VPN service provider offers a secure private networking environment within a shared public insecure infrastructure through encapsulation and encryption of all traffic from the VPN application within the VPN user's device to the remote access VPN server.

Most VPN providers rely on a tunneling protocol to create a private network to add a layer of security that protects each packet on its journey over the Internet. Tunneling is the process of placing the entire packet within another packet before it is transported over the internet. The outer packet protects the contents from public view and ensures that the packet moves within a virtual tunnel. This virtual tunnel is a point-to-point tunnel established between a user device and a VPN server. This layering of packets is called encapsulation. Computers or other network devices at both ends of the tunnel, called tunnel interfaces, can encapsulate outgoing packets and reopen incoming packets. Additionally, in a VPN network, devices at each end of the tunnel encrypt the data entering the tunnel and decrypt them at the destination.

Encryption is the process of changing the data from a transparently readable format to an encoded, unreadable format with the help of an encryption algorithm. This encoded format can only be decoded with the right decryption key. VPN encryption, as mentioned before, renders the user's online traffic indecipherable to any third-party monitoring them. At the fundamental level, when a user launches a VPN application and connects to a VPN server, at least some of the subsequent user's requests are encrypted before they are sent to the VPN server. These requests are decrypted by the VPN server and forwarded to the intended target on the Internet. The VPN server may receive reply data from the intended target. The VPN server encrypts the reply data and transmits the encrypted reply data to the user device. Once the encrypted reply data reaches the user device, the data is decrypted by the VPN application so that the user can, for example, view them.

VPNs generally use different types of encryption algorithms to encrypt and decrypt user's online traffic. Symmetric encryption is one of the algorithms that rely on the identical public key and private key. This form of encryption is considered relatively fast, and one example of symmetric encryption is the AES encryption cipher. Another type of encryption algorithm is the Asymmetric encryption, which may also be known as public key cryptography. This algorithm uses different keys for the encryption and decryption processes. An example of asymmetric encryption is the RSA (Rivest-Shamir-Adleman) protocol.

VPN encryption keys may be randomly generated strings of bits that are used to encrypt and decrypt data. Each encryption key may be generated in such a way that it is unique. The length (and strength) of an encryption key may be expressed in bits. Usually, the longer the key, the stronger the key encryption. Two types of encryption keys are being used: private keys and public keys. They are mathematically related, since any kind of information that is encrypted with a public key can only be decrypted with a private key associated with it. The public key is usually available through a public directory, while the private key remains confidential and is only accessible by the key owner.

When a user accesses a VPN client application on a user device associated with the user, the user may first be taken through a user authentication procedure. User authentication is the verification of credentials required for confirmation of a user's authenticity. In other words, authentication is used to prove a user is allowed access, and so provides a form of access control. A typical user authentication consists of verifying a simple ID and password combination. However, more authentication factors may be added to improve the security of the VPN user. The primary authentication factors are knowledge, possession and inherence. Knowledge factors include all things a user must know in order to log in to the VPN client application, e.g., usernames or ID, passwords and PINs. In the same way, possession factors consist of anything a user must have in their possession, such as one-time password (OTP) tokens. Finally, the inherence factors include any inherent trait the user has that are confirmed for accessing the VPN client application such as fingerprint scans, retina scans, iris scans, etc.

A typical VPN service consists of a network of VPN servers, typically spread across several geographical locations. A VPN server may be a physical or a virtual server that is configured to host and deliver VPN services to users (i.e., to user devices). A VPN server may be implemented as a combination of hardware and software and may have one or more logical and physical communication ports for receiving network traffic. In a typical scenario, an end user application (e.g., an internet web browser) may execute on a user device and may communicate with (e.g., transmit network traffic to and receive network traffic from) another application (e.g., a web server) executing at a network node that may be available on the internet. The VPN client executing on the user and a VPN server may facilitate and secure the exchanged network traffic between the user device and the network node. As such, an encrypted tunnel is said to be established between the user device and the VPN server.

The VPN client application may connect with the VPN server, encrypt network traffic that is to be delivered to the other application executing at the network node, and send the encrypted network traffic from the user device to the VPN server. After receiving the encrypted traffic, the VPN server decrypts the encrypted network traffic and forwards the network traffic to the network node. The network node may transmit back reply data, such as in response to the content of the network traffic. In response to receiving the reply data from the network node, the VPN server encrypts the reply data and transmits the encrypted reply data to the user device. The VPN client application of the user device decrypts the encrypted reply data and hands the reply data to the user application. In an example, the decrypted reply data can be presented to the user (such as in the form of an internet browser page).

To reiterate, the VPN client application may be a software-based and/or a hardware-based technology that establishes a secure connection between a user device and a VPN server. Some VPN client applications work in the background of the user device automatically, while others have front-end interfaces that allow users to interact with and configure them. VPN client applications may be installed on computers (e.g., user devices). However, some organizations provide a purpose-built VPN client application that is a hardware device pre-installed with VPN software. Generally, VPN client applications operate on more than one VPN protocol to encrypt and decrypt the data. Some of the commonly used VPN protocols are OpenVPN, SSTP, PPTP, L2TP/IPSec, IKEv2, SoftEther.

Most of the VPN services allow users to select or switch between different servers in the private network according to the user's choice of location or requirements. For instance, if a user wants to connect to a VPN server that is located in the USA, the user can simply choose the location through the graphical user interface and the connection (e.g., an encrypted tunnel) may be established with the USA-based server. The existence of multiple servers in a VPN service network makes it possible for users to choose the locations of VPN servers to connect to. Without this provision of choice, a user device may be assigned (e.g., connected to) a random VPN server without an ability for the user to choose an available VPN server that better satisfies certain parameters. The more VPN servers a VPN service provides, the better it is for the users. This is because the users will have more servers to choose from, and they can access even the remotest websites that are only available in certain countries.

However, most VPN services do not have an inbuilt system or a method to recommend or identify optimal VPN servers for a particular user device from the available VPN servers. Average users often do not have clarity for identifying and selecting the optimum server to serve their purposes. Therefore, users mostly tend to randomly choose a server in a VPN service provider without weighing the servers' various parameters and conditions. Without evaluating the server conditions, the user is left in ambiguity while choosing a random server. One cannot be assured that all servers in a VPN service can be ideal. As such, it is important for the VPN service provider to evaluate and recommend servers to users accessing their services. This ensures reliability, connectivity, and improves user experience significantly.

SUMMARY

A first aspect is a method that includes receiving an intended network usage; and retrieving an association between the intended network usage and a virtual private network (VPN) server. The method further includes, responsive to determining not to use the VPN server, obtaining a new VPN server from a central server; establishing an encrypted tunnel with the new VPN server; and storing an association between the new VPN server and the intended network usage. The method further includes encrypting a communication directed to a network server to obtain an encrypted communication; and transmitting the encrypted communication via the encrypted tunnel.

A second aspect is a device that includes a memory and a processor. The processor is configured to execute instructions stored in the memory to receive an intended network usage; and retrieve an association between the intended network usage and a virtual private network (VPN) server. The instructions further include instructions to, responsive to determining not to use the VPN server, obtain a new VPN server from a central server; establish an encrypted tunnel with the new VPN server; and store an association between the new VPN server and the intended network usage. The instructions further includes instructions to transmit a communication to a network server via the encrypted tunnel.

A third aspect is a non-transitory computer readable medium storing instructions operable to cause one or more processors to perform operations that include receiving an intended network usage and retrieving an association between the intended network usage and a virtual private network (VPN) server. The operations further include, responsive to determining not to use the VPN server, obtaining a new VPN server from a central server; establishing an encrypted tunnel with the new VPN server; and storing an association between the new VPN server and the intended network usage. The operations further include encrypting a communication directed to a network server to obtain an encrypted communication; and transmitting the encrypted communication via the encrypted tunnel.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 is a flow diagram of an example of the operations of iteratively requesting a next VPN server to connect to.

DETAILED DESCRIPTION

Figure 1:
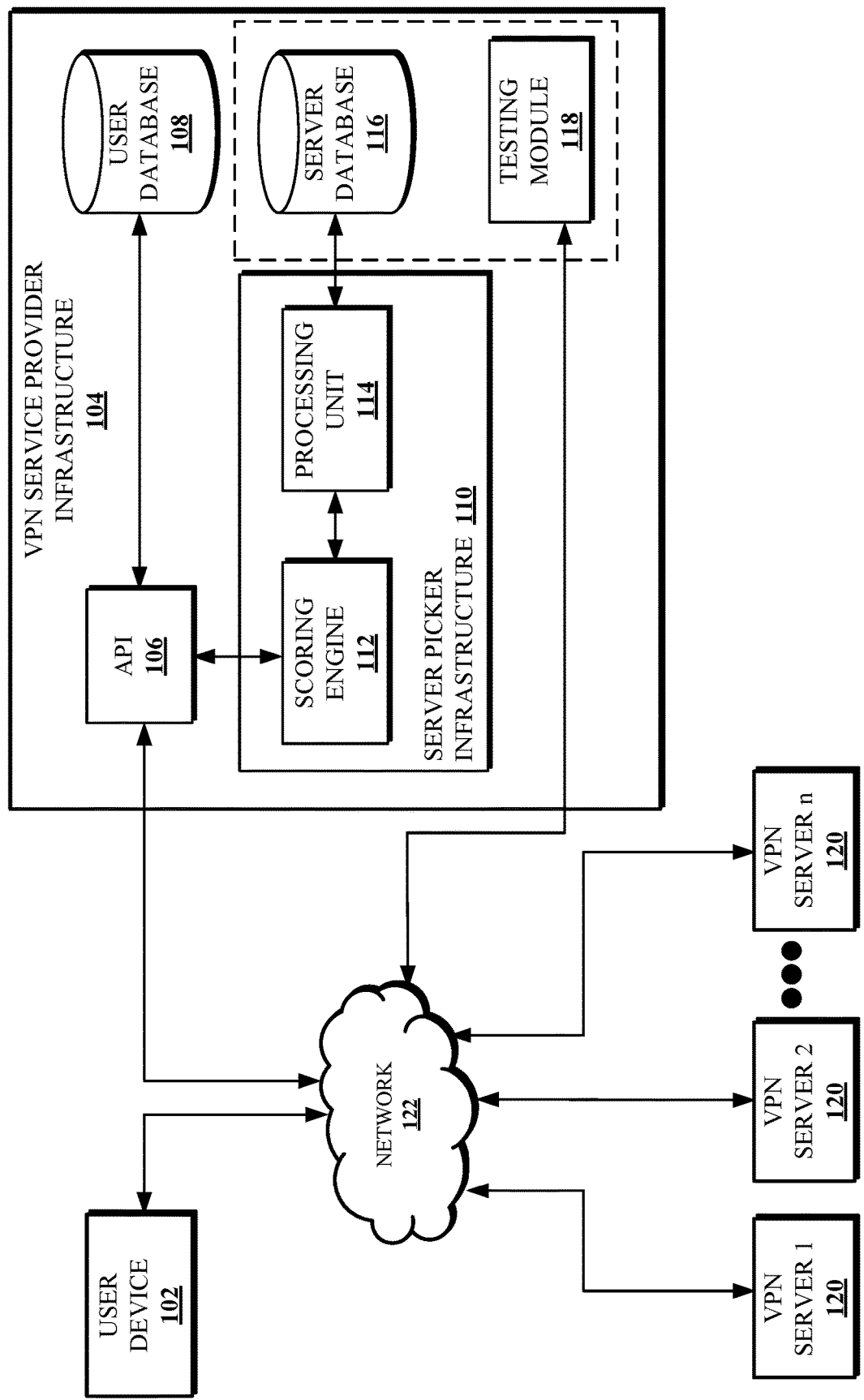
FIG. 1 shows a block diagram of an example of an overall architectural depiction of components.

As already mentioned, a VPN service may deploy a VPN network that includes several VPN servers. However, not all VPN servers in the VPN network may be suitable for servicing a particular user (i.e., a particular user device associated with the user). In some instances, there can be poor connectivity between a chosen server and the user device, where the chosen server may be selected by the user from the list of available servers. For example, there can be occasional lag or other difficulties (e.g., network outage or VPN server overload) when the user device is connected with a chosen server in a VPN network. These impediments in a VPN network are due to various unavoidable factors that tend to affect VPN servers' performances. Additionally, while it may be possible for a user device to establish connections with several VPN servers, some of the VPN servers may be better to satisfy a particular usage of the user.

Implementations according to this disclosure solve problems such as these by providing a VPN service provider infrastructure that analyzes and evaluates VPN server conditions to provide one or more VPN servers to a user device. For example, a request may be received from the user device for one or more VPN servers, the VPN service provider infrastructure calculates respective penalty scores for at least some of the available VPN servers and return to the user device a subset of the available servers. The penalty scores can be calculated based on server conditions (i.e., conditions of or related to the respective available servers) and at least one aspect of the user device, such as the location of the user device, an internet service provider of the user device. Moreover, the server conditions can be volatile over time and may be monitored at regular intervals.

For instance, the location of the user device can be an important condition in evaluating a VPN server for a particular connection request. If the chosen server is significantly far from the actual location of the user device, then there may be chances of poor connectivity and lower VPN server speed. The reduction in the VPN server speed correlates to how far the connection must travel since chances of packet losses also rise with longer distances, which reduces the network speed. VPN server load can also be another condition in evaluating VPN servers. A VPN server load (or simply, server load) is the amount of total server bandwidth currently being used and it directly correlates to the number of user devices sharing the VPN server at once. Overloading of servers in a VPN network is a common reason for experiencing lag or poor connectivity. When numerous user devices are connected to the same VPN server simultaneously, the VPN server may overload with plenty of requests, affecting the VPN server performance. Availability of an insufficient number of VPN servers in a given location to meet the demand is one reason for overloading as users lack the sufficient choices of VPN servers, which makes it impossible to distribute the users' load across multiple VPN servers.

Apart from the distance of a server and overloading, if a chosen VPN server is not located on or not in proximity with an international Internet exchange hub, then there are chances for slower network speed. Servers that are in close proximity to an international Internet exchange hub have significant server speed, and all connections that pass through these exchange hubs are typically faster than servers that are not located close to international Internet exchange hubs. The better speed and connectivity are due to how international Internet cables are laid. For instance, if a user located in the United States intends to connect with a server in the UK and chooses a server in Plymouth over another in London (since Plymouth is closer to the United States than London), the user may experience lag or reduced server speed as compared to choosing a London-based server. Because London is one of the exchange hubs on the international Internet exchange hub and all connections to Plymouth pass through London, choosing a London-based server would provide better results (e.g., better performance). Connections to London servers tend to be faster compared to other locations that are considerably far away from the international Internet exchange hub. For that reason, it will be beneficial to develop systems and methods to identify servers that are in proximity to an International internet hub so that potential lag and network problems can be avoided.

Several other conditions render specific servers suitable or not so suitable for servicing the user. Therefore, the VPN service provider must develop methods or systems to evaluate conditions pertaining to several VPN servers to efficiently service their users. Identifying and recommending an optimal VPN server from among the given (i.e., available) set of VPN servers can improve server response time, data throughput and overall user experience. To address this issue, implementations according to this disclosure can dynamically evaluate, identify, and connect the user with an optimal VPN server from among a given set of VPN servers.

In some situations, even if a VPN server is deemed optimal, there can be several reasons (including, for example, that the optimal VPN server may be blocked to the ISP of the user device). As such, implementations according to this disclosure can identify a list of VPN servers from amongst the available servers so that the user can attempt to establish a connection (i.e., establish an encrypted tunnel) with one of the VPN servers of the list of VPN servers. As further described below, the list of VPN servers may be obtained based on the ISP of the user device, based on an intended network usage of the user device, such as whether the user device is to be used for gaming, streaming, or some other intended network usage.

Some general terminology descriptions may be helpful and are included herein for convenience and are intended to be interpreted in the broadest possible interpretation. Elements that are not imperatively defined in the description and should have the meaning as would be understood by the person skilled in the art.

FIG. 1 shows a block diagram of an example of an overall architecture of the current embodiment that comprises user device 102, which can be any computing or networking device (e.g., a personal computer, mobile phone, a tablet computer, router, smart home device) having access to a particular network (e.g., Internet) and to a VPN application, a VPN service provider infrastructure 104, plurality of VPN servers 120. All the mentioned components of the embodiments have access to network 122 and are able to interact with each other through the same. Here, network 122 can be any digital telecommunication network that permits several nodes to share and access resources, e.g., local-area network (LAN), wide-area networks (WANs), campus-area networks (CANs), metropolitan-area networks (MANs), home-area networks (HANs), Intranet, Extranet, Internetwork, Internet. The VPN service provider infrastructure 104 is shown as including an application programming interface (API) 106, a user database 108, a server picker infrastructure 110, a testing module 118, and a server database 116. However, the VPN service provider infrastructure 104 may include fewer or more modules. In some implementations, some of the modules may be split into more modules and some of the modules may be combined. The VPN service provider infrastructure 104 is also referred to herein as a "central server."

The server picker infrastructure 110 in turn can include the following components: a scoring engine 112 and a processing unit 114. The VPN server 1 120, VPN server 2 120, VPN server n 120 represents the plurality of VPN servers present in the VPN network. In other words, each server in the plurality of the VPN servers 120 is provisioned to perform the same task as any other VPN server 120, but can be spread out geographically. While the elements shown in FIG. 1 implement an example of an embodiment, some elements in other embodiments can have different titles or can be combined into a single element instead of two separate elements (for example, scoring engine 112 and processing unit 114 can be combined into a single hardware, software infrastructure to form a single logical unit. Likewise, testing module 118 and server database 116 can also be combined into a single hardware, software infrastructure or can be combined into a single unit on a cloud.) However, the functionality of elements and the flow of information between the elements is not impacted generally by such consolidations or combinations. Therefore, FIG. 1 as shown should be an example only, and not restrictive or exclusionary of other features, including features discussed in other areas of this disclosure here within.

In FIG. 1, all occurrences of communication between a user device 102, a VPN service provider infrastructure 104, and a plurality of VPN servers 120 occur through a network 122. The instances of communication between the user device 102 and the VPN service provider infrastructure 104 include but are not limited to authentication, authorization, data exchange, etc. The communication instances between the user device 102 and the plurality of VPN servers 120 can happen through an encrypted tunneling protocol provided by a VPN application (not shown) installed on the user device 102. The tunneling protocols can include but are not limited to PPTP, SSTP, L2TP/IPSec, OpenVPN, SSTP, IKEv2, SSL/TLS, or Wireguard.

The user device 102 can be any computing device capable of hosting the VPN client application. It can comprise any physical device that is connected to a network, including, for example, a laptop, a mobile phone, a tablet computer, a desktop computer, a smart device, a router and other network devices. The user device 102 can also be a device that is capable of network connectivity, but not primarily intended for networking, such as connected home appliances, smart home security systems, autonomous farming equipment, wearable health monitors, smart factory equipment, wireless inventory trackers, biometric cybersecurity scanners, and others.

The VPN service provider infrastructure 104 can be a combination of hardware and software that provides functionality for multiple user devices (such as the user device 102) via the network 122. The VPN service provider infrastructure 104 can receive a request to establish a VPN connection from the user device 102 and can also forward the IP addresses of the optimal VPN servers and other VPN servers, as described herein, along with authentication credentials for the purpose of establishing an encrypted tunnel to the user device 102. Specifically, the VPN service provider infrastructure 104 may include the server picker infrastructure 110, which is responsible for identifying the optimal VPN server and other lists of VPN servers, as described herein, through in-built algorithms and computations. The VPN service provider infrastructure 104 also contains databases, which can persistently store and contain data necessary for servicing the VPN client. In some implementations, the VPN service provider infrastructure 104 can include the testing module 118, which can gather information related to the plurality of VPN servers 120. The VPN service provider infrastructure 104 can be a combination of physical devices, virtual machines/servers, or can be located on the cloud.

The API 106 is a programming interface consisting of one or more endpoints to a defined request-response message system. In simple terms, the API 106 is the interface between the user device 102 and the VPN service provider infrastructure 104. The API 106 can handle authentication requests from user devices, such as the user device 102, and can also mediate the requests for establishing a VPN connection. The API 106 can be a constituent of the VPN service provider infrastructure 104 and it can respond to requests for VPN server IP addresses (or simply, request for VPN servers) from the server picker infrastructure 110. The API 106 can also send a database query to the user database 108 in order to authenticate the user device 102. The API 106 can operate (e.g., be deployed at, be executing at) on any hardware or can be cloud-based.

The user database 108 can be a component of the VPN service provider infrastructure 104 and can be a structured repository of authentication credentials belonging to the owners of multiple user devices (such as the user device 102). The user database 108 can store user-related data in tables (named columns and multiple rows), where there is information included regarding the authentication credentials of the owner of user device 102. The user database 108 can be responsible for verifying credentials of the owner of the user device 102 and allowing the user device 102 to connect with the VPN service provider infrastructure 104. The user database 108 can be populated with user profiles continuously and can be responsible for authenticating, authorizing multiple user devices. The user database 108 can be any physical storage device or a cloud-based storage.

The server picker infrastructure 110 can be a logical unit and a constituent of the VPN service provider infrastructure 104 that is configured to perform complex operations of identifying the optimal VPN server from among the plurality of VPN servers 120. The server picker infrastructure 110 is capable of querying the server database 116 for server data which is used for computing server penalty scores. It also communicates and provides data to the user device 102 through the API 106 concerning VPN servers, such as an identified optimal VPN server and other VPN servers as described herein. It can be a combination of software and hardware present within or in combination with the VPN service provider infrastructure 104 but under the direction of interactions with the VPN service provider infrastructure 104.

The scoring engine 112 can be a component within or in combination with the server picker infrastructure 110 that is configured to manage, perform arithmetical and logical operations for calculating respective server penalty scores for the VPN servers 120. The processing unit 114 can be a combination of software and hardware and is capable of identifying, and returning, the IP addresses of at least some of the VPN servers of the plurality of the VPN servers 120, such as the IP address of the optimal VPN server, to API 106 through a series of analytical operations.

The processing unit 114 can be a logical component within or in combination with the server picker infrastructure 110 that is configured to perform complex operations of computing numerical weights of various server conditions. The processing unit 114 may also contain an internal storage unit and can be a combination of hardware and software.

The server database 116 can be or provide a storage unit for storing server conditions collected by the testing module 118 and other data obtained from user devices via the API 106, such as ISP data, network usage data, or success connectivity data, as described herein. Server conditions can include but may not be limited to location, load, time of creation, hub score, server IDs, etc., of the plurality of VPN servers 120. The server database 116 can be a combination of hardware and software or a cloud-based system that offers a database management system.

The testing module 118 can be a processing unit that gathers several information about the plurality of VPN servers 120 known as the server conditions. The testing module 118 is capable of performing tests against individual VPN servers of the VPN servers 120 in order to gather information related to speed, load, round time, etc. The testing module 118 can gather several information on server conditions and can also be capable of determining respective hub scores for the plurality of VPN servers 120. In some implementations, the testing module 118 and the server database 116 can be located in a separate system present within or in combination with the VPN service provider infrastructure 104.

The VPN servers 120 (e.g., VPN server 1, VPN server 2, . . . , VPN server n) are example instances of the plurality of VPN servers. The number of VPN servers in the plurality of VPN servers 120 is not limited and depends on the VPN network provider's infrastructure. A VPN server is a physical or virtual server that is provisioned to host and deliver VPN services to multiple user devices (such as the user device 102) worldwide. Each of the VPN servers of the plurality of VPN servers 120 may be a combination of VPN hardware and VPN software that allows a VPN client installed on the user device 102 to connect to a secure private network. A VPN server 120 usually contains logical and physical communication ports.

The network 122 can be a digital telecommunications network that allows nodes to share and access resources. Examples of the network 122 include a local-area network (LAN), a wide-area network (WAN), a campus-area network (CAN), a metropolitan-area network (MAN), a home-area network (HAN), an Intranet, an Extranet, an Internetwork, and the Internet.

Brief descriptions of some of the terms used herein (e.g., an optimal VPN server, a server penalty score, a numerical weight, a random value, Unix time, a hub score, an International Internet exchange hub,) are now provided.

An optimal VPN server can be a VPN server among the plurality of VPN servers that has the least (i.e., smallest) server penalty score amongst the VPN servers 120 and is chosen by the server picker infrastructure 110 as the optimal one or in other words as the best available server from among the plurality of VPN servers 120 for the user device 102 to establish a VPN connection with.

A server penalty score of a particular VPN server can be a numerical indicator that infers the quality and condition of the particular VPN server. The server penalty score is calculated by using numerical weights associated with the particular VPN server. The numerical weights can be direct numerical representations of various server conditions.

The numerical weights can be numerical representations of multiple server conditions. The numerical weights can be calculated using algorithms of the processing unit 114, which can include various arithmetic operations and formulae. An algorithm here refers to multiple formulary arithmetic operations performed by the processing unit 114. Each server condition can have corresponding numerical weights calculated by the processing unit 114.

A random value can be a numerical value that is calculated by the scoring engine 112 using the random value seed. The random value seed refers to the numerical value that is generated using one or more values. Server ID, client application ID, Unix time value can be examples of values that are used to generate the seed for calculating the random value.

Unix time format can be a date-time format used to express the number of milliseconds that have elapsed since January 1,1970 00:00:00. It consists of two layers of encoding in which the first layer encodes a point in time as a scalar real number and the second layer encodes the scalar real number as a sequence of bits or decimal digits.

A Hub score can be a numerical value determined and assigned to the plurality of VPN servers 120 by the testing module 118. The hub score is determined based on a VPN server's proximity to an international Internet exchange hub. Usually, zero or minimal value indicates that a particular VPN server is considerably closer to an international Internet exchange hub.

International Internet exchange hub can be a physical infrastructure through which ISPs exchange Internet traffic between their networks. The primary purpose of an international Internet exchange hub is to allow networks to interconnect directly, via the exchange, rather than through one or more third-party networks. The primary advantages of direct interconnection are cost, latency, and bandwidth.

With continued reference to FIG. 1, the API 106 can receive requests from the user device 102 via the network 122. A request from the user device can be or include an authentication request or a request for the IP address of a VPN server (i.e., a request for a VPN server). The VPN server can be an optimal VPN or some other VPN server, as described herein. The request can be for multiple VPN servers. The user device 102 attempts to establish a VPN connection (i.e., establish a connection or establish an encrypted connection) with one of the provided VPN servers. Initially, when the user device 102 approaches the VPN service provider infrastructure 104, the first request is usually an authentication request. Valid credentials are provided by the user device 102 for the purpose of authentication, which is then verified by the API 106 by accessing the user database 108. The API 106 queries the user database 108 for verifying the credentials provided by the user device 102 against the data present in the user database 108. Once the credentials are validated, the API 106 authenticates and authorizes the user device 102.

After authentication, the user device 102 may request, via the API 106, the IP address of, for example, an optimal VPN server in order to establish a VPN connection. To satisfy the request, the API 106 in turn requests the optimal VPN server from the server picker infrastructure 110. The server picker infrastructure 110 is responsible for identifying the optimal VPN server from the plurality of VPN servers 120. Through a series of in-built methods and/or systems, the server picker infrastructure 110 is able to identify the optimal VPN server. In particular, the server picker infrastructure 110 identifies an optimal VPN server by calculating respective server penalty scores for at least some of the VPN servers of the plurality of VPN servers 120. That is, the server picker infrastructure 110 calculates a server penalty score for each of the least some of the VPN servers the plurality of VPN servers 120. A server penalty score can be based on multiple server conditions obtained through the testing module 118. The scoring engine 112 proceeds to calculate the server penalty score of a VPN server by using the numerical weights provided by the processing unit 114, and the random value for the VPN server calculated by the scoring engine 112. The random value can be a very small numerical value, such as a value in the interval [0, 0.001]. Addition of this very small value to the server penalty score calculations ensures that each score is different and avoids coincidences (e.g., collisions, equality) of server penalty score values.

The IP addresses of the plurality of VPN servers 120 are arranged in an ascending order according to their respective server penalty scores. The scoring engine 112 then identifies the optimal VPN server by choosing the server with the lowest penalty score. In another example, the scoring engine 112 may provide a list of VPN servers, based on the calculated server penalty scores, as a subset plurality of VPN servers 120. After which, the scoring engine 112 returns the IP address(es) of the identified VPN server(s) to the API 106.

In the case of the optimal VPN server, the user device 102 receives the IP address of the identified optimal VPN server through the API 106, after which the user device 102 makes a secure connection with the optimal VPN server identified by the scoring engine 112. The scoring engine 112 and the processing unit 114 include respective internal storage units or an internal memory capable of storing, arranging, and sequencing data.

The server database 116 and the user database 108 can be conventional databases offered by MySQL, MSSQL, NoSQL, object-oriented databases, or any other type or category of databases. Data storage-wise, the server database 116 can also be a data storage within the memory of a computing device or within a cloud. The server database 116 can be responsible for storing, organizing, and returning data related to the plurality of VPN servers 120, as described herein. Similarly, the user database 108 can be responsible for storing, and returning authentication credentials of user device 102 accessing the VPN service provider infrastructure 104. Information regarding the plurality of VPN servers 120 are stored in the server database 116 for the purpose of penalty score calculations.

All requests from the user device 102 can be executed (e.g., received) through a VPN application installed locally or remotely, launched locally or as a remote application. This VPN application, also called the VPN client, is a software-based technology that establishes a secure connection between the user device 102 and a VPN server. The VPN application can include a front-end interface that allows the user of the user device 102 to interact with and configure the VPN application. In some cases, a VPN application can be a standalone purpose-built device, or a standard computing or networking device installed and configured with the VPN application software.

Further, in FIG. 1, the testing module 118 can be responsible for collecting the information related to multiple server conditions including but not limited to geo-locations of servers, IP addresses of servers, locations of servers with respect to the international internet exchange hub, creation time of servers, load measurements of servers, etc.

The testing module 118 can determine respective hub scores for at least some (e.g., all) of the VPN servers of the plurality of VPN servers 120 based on their proximity to the international Internet exchange hub. Hub scores are assigned by the testing module 118 and indicate the proximity of a VPN server to the international internet exchange hub. A higher hub score indicates that a server is significantly farther from an international Internet exchange hub and vice versa. Furthermore, the testing module 118 can also monitor and measure the load of a particular server at regular time intervals and can update the load measurements in the server database 116. All the necessary information regarding the server conditions are populated into the server database 116 by the testing module 118 which are then later utilized by the server picker infrastructure 110.

The embodiments described herein enable effectively establishing a VPN connection between the user device 102 and a VPN server (such as the optimal VPN server) from among the plurality of VPN servers 120. According to an embodiment, an optimal VPN server is identified through producing a list of the plurality of VPN servers 120 which is arranged according to their server penalty score, beginning with the least score value. The server with the least penalty score value is considered to be the optimal VPN server.

In an example, the plurality of VPN servers 120 are constantly updated and rearranged within the suggested list of VPN servers 120 according to their server penalty scores, with the lowest score value always at the top, enabling a dynamic and effective system and method to identify the optimal VPN server from the list of scored VPN servers 120.

Another feature of the disclosed implementations includes computing respective server penalty scores for at least some of the plurality of VPN servers 120. As already mentioned, a server penalty score is an indicator of the suitability of a particular server for servicing the user device 102. First, numerical weights for the plurality of VPN servers 120 are computed based on their server conditions. Multiple server conditions of an individual VPN server are represented numerically through the calculations of numerical weights. Using these numerical weights, the server penalty score for a VPN server present is determined and computed.

Another feature of the disclosed implementations includes accessing the server database 116, which contains information related to several server conditions gathered by the testing module 118. The server database 116 and the testing module 118 can be either inbuilt or in combination with the current embodiment. The testing module 118 can be responsible to gather information relating to several server conditions of the plurality of VPN servers 120.

Figure 2A:
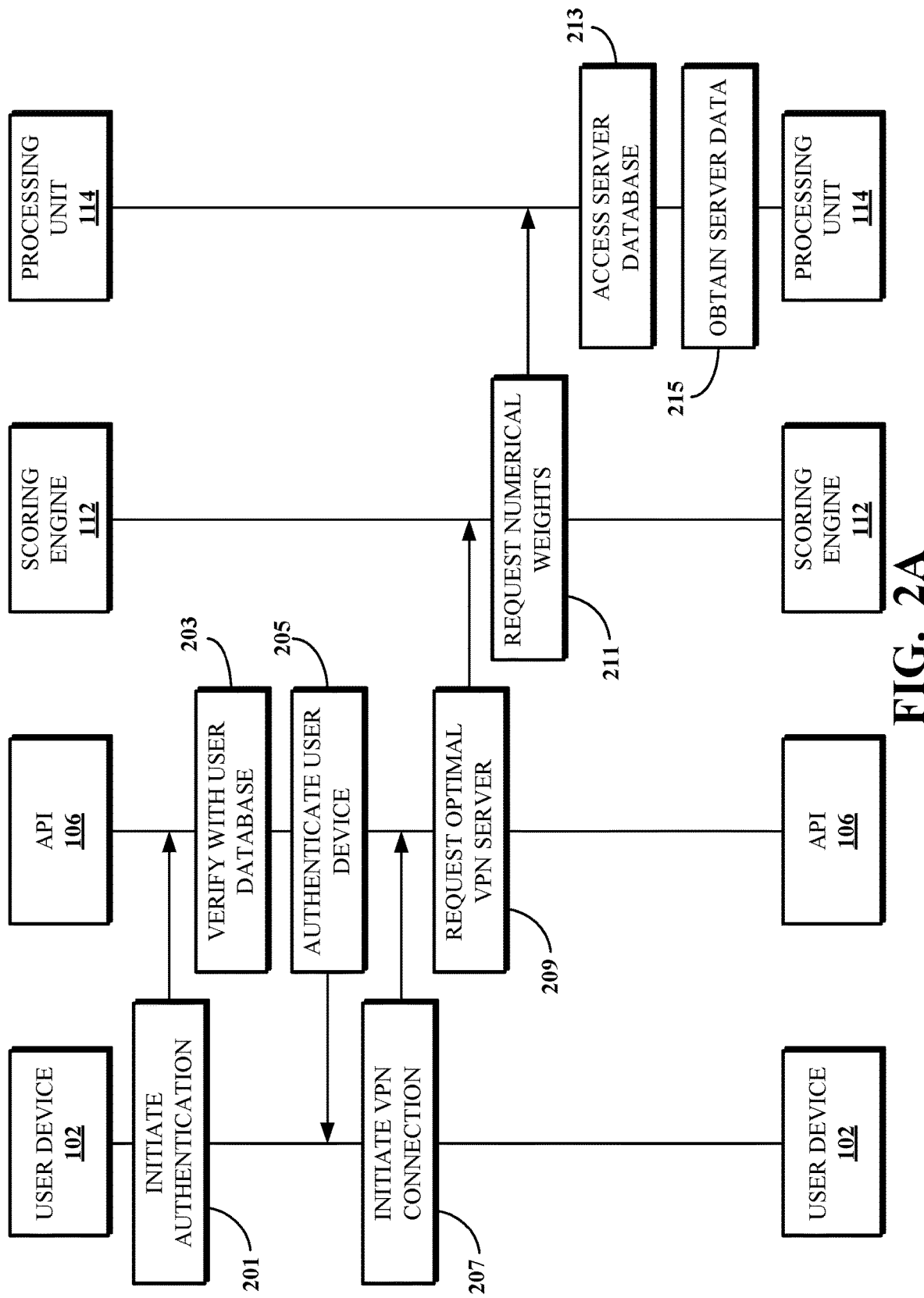
FIG. 2A shows an example of a flow diagram of the operations of identifying an optimal VPN server.
Figure 2B:
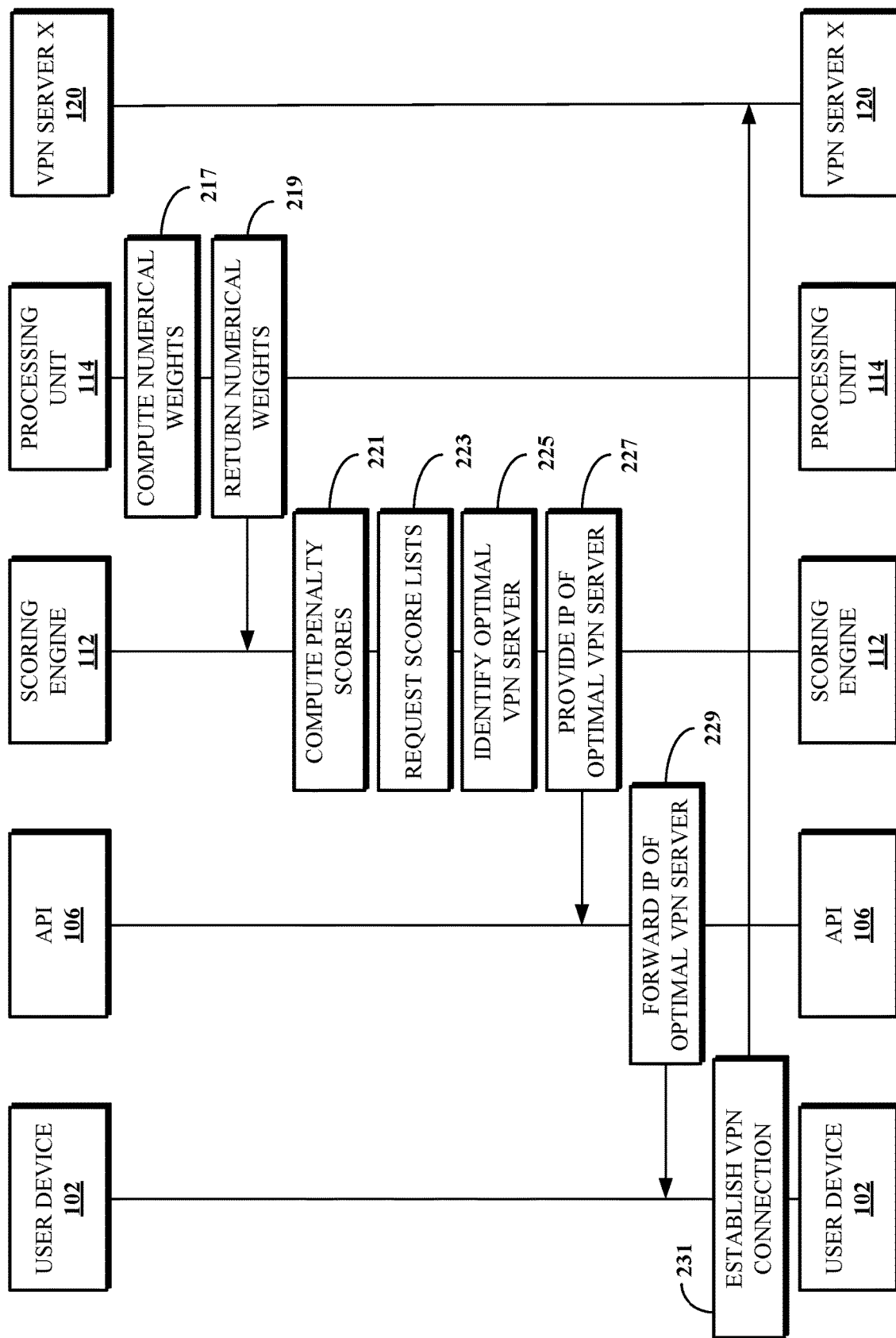
FIG. 2B is a continuation diagram showing an example of flow diagram of the operations of identifying an optimal VPN server.

The following figures illustrate the above-mentioned processes and the various embodiments involved with more technical detail. FIGS. 2A and 2B depict an example of a flow diagram of the current embodiment. The user device 102, before accessing the optimal VPN server from among the plurality of VPN servers 120, may have to authenticate itself with the VPN service provider infrastructure 104. The process of authentication may not be an exclusive part of the illustrated flow diagram; rather, it may be a foundational step or, in other words, an initial procedure to access the services of the VPN service by the user device 102.

In step 201, the user device 102 with the VPN application initiates to authenticate itself with the VPN service provider infrastructure 104 via the network 122. This request to authenticate is handled by the API 106 of the VPN service provider infrastructure 104 which receives the credentials provided by the user device 102. The API 106 in step 203, queries the user database 108 and verifies the credentials provided by the user device 102 against the data existing in the user database 108. Once the verification is successful, the API 106 authenticates the user device 102 in step 205. The authentication process may involve verifying the combination of the user ID and password or PIN provided by the owner of the user device 102. Verification of OTP (one time password) tokens or biometric traits can also be involved in the process of authentication. The authentication process is important because it enables the VPN service provider infrastructure 104 to keep its networks secure by permitting only authenticated user devices to access its secured services. Once authenticated, the user device 102 is usually subjected to an authorization process as well, to determine whether the authenticated user device 102 should be permitted further access to the VPN Services. The terms authentication and authorization are often used interchangeably. While they may often be implemented together, the two functions are distinct. Authentication is the process of validating the identity of a connecting user behind the user device 102 before allowing access to the VPN services, whereas authorization on the other hand is the process of validating whether the authenticated user device 102 has been granted permission to access the requested services. The authentication process is a prerequisite for the authorization process to happen.

After authentication is successful, in step 207, the user device 102 requests for the IP address of a VPN server to establish a VPN connection. This request for the IP address is received by the API 106 which is responsible for handling such requests. The API 106 in step 209 recognizes this request of the user device 102 and further requests for the IP address of an optimal VPN server from the Scoring engine 112 of the server picker infrastructure 110.

Responding to the request from API 106, the scoring engine 112 begins to calculate the server penalty score for the plurality of VPN servers 120. For this, the scoring engine 112 requires numerical weights that are computed by the processing unit 114 based on multiple server conditions. In step 211 the Scoring Engine requests numerical weights from the processing unit 114. As defined above, the processing unit 114 is a logical unit that is capable of performing arithmetical and logical operations in order to calculate the numerical weights. Numerical weights can also be roughly termed as sub scores that are calculated for each server condition by converting them into mathematical expressions. The mathematical expressions and the formulary arithmetic operations used for calculating the numerical weights are collectively termed as the internal algorithm of the processing unit 114.

Once the request is received by the processing unit 114, in step 213 it sends a query to the server database 116 containing all necessary information on server conditions relating to the plurality of VPN servers 120. The server database 116 contains data related to server conditions such as server location, server hub score, server time of creation and server load for the plurality of VPN servers 120. The server database 116 contains data related to server conditions which are not limited to server location, server hub score, server time of creation and server load for the plurality of VPN servers 120. The server conditions stored in the server database 116 are obtained by the processing unit 114 in step 215 through the database query.

After obtaining server conditions for the plurality of VPN servers 120, the processing unit 114 proceeds to calculate the numerical weights. The following explanations and algorithms are some example methods of how the processing unit 114 computes the necessary numerical weights, and it may include various other mathematical methods as well.

To enable the calculation of the country weight, the API 106 forwards the IP address of the user device 102 to a third-party geolocation service in order to identify the country of the user device 102. The third-party geolocation services have access to several databases containing geolocation information for numerous IP addresses. Through requesting the geolocation services, the API 106 is able to receive the country code or in other words information regarding the country of a particular user device 102 is obtained. The API 106 forwards this information regarding the country of the user device 102 to the internal memory of the processing unit 114. With this information the processing unit 114 is able to calculate one of the numerical weights known as the country weight. One must note that this information regarding the country of the user device 102 is only used in the calculation of the country weight and is removed from the internal memory of the processing unit 114 as soon as the calculation is done.

Now, for calculating the country weight, the processing unit 114 assigns the numerical value '1' for all servers in the plurality of VPN servers 120 that are not located in the country of the user device 102. Conversely, the processing unit 114 assigns the numerical value '0' for all servers in the plurality of VPN servers 120 that are located in the same country as the user device 102. With this algorithm, the servers that are present in the same country will have lesser scores indicating the proximity to the user device 102. Since this numerical weight is an indicator of the country location of the plurality of VPN servers 120, these are termed as the country weights by the processing unit 114. The reason behind identifying the nearest server is that the connectivity is faster, and the chances of packet loss are reduced.

Next, with the hub score data, the processing unit 114 computes the hub weight for each server in the plurality of VPN servers 120. In an example, this may be done through the following mathematical expression that may be configured in the processing unit. Therefore, the hub weight may be calculated as follows:

$$\text{Hub weight} = -(\text{country weight}) \times \text{hub score}$$

It is important to identify servers that are located in closer proximity to an international internet exchange hub because of reliability and speed in connectivity. Since the country weight is an element of $\{1,0\}$, the hub weight will in reality be of $\{-(\text{hub score}), 0\}$. Therefore, based on the above algorithm, the hub weight of a server on the international internet exchange hub with non-zero hub score and country weight, will be a non-zero value as well, while for local servers the hub weight value will be zero regardless of hub score.

The processing unit 114 computes the time weight using the data related to the server creation time. Each server in the plurality of the VPN servers 120 has an attribute known as the time of creation or simply creation time. In order to use this attribute, the processing unit 114 converts the format of the creation time into Unix time format and normalizes it by using the following expression:

$$T(n) = (\text{creation time} - \max(\text{creation time}))/((\max(\text{creation time}) - \min(\text{creation time})))$$

Here, max(creation time) and min(creation time) are maximum and minimum values of creation time within a given set of servers in the plurality of VPN servers 120. With the normalized time T(n), the processing unit 114 then computes time weight for each server in the plurality of VPN servers 120 using, in an example, the following expression:

$$\text{Time weight} = \beta(T(n)+\kappa)^{\theta} + \lambda$$

Here, $\beta$ is a multiplier constant, has the value of $-0.15$, $\kappa$ is a constant indicating the horizontal shift in creation time and has the value of 0.5 and $\lambda$ is a constant indicating the vertical shift in the creation time and is equal to 1. Furthermore, the exponent $\theta$ is known as the exponential constant in time penalty and has the value of 7. Therefore, substituting the values the time weight expression can be:

$$\text{Time weight} = -(0.15)(T(n)+0.5)^{7} + 1$$

Since the domain of the normalized time T(n) is bound within the interval $\{0, 1\}$, therefore, the range of the time weight is bound within the interval $\{1, -1.662890625\}$. This means that the oldest server in a given set of the plurality of VPN servers 120 will have a value of 1 whereas, for the most recently created server the value will be approximately $-1.56$. It is important to identify the servers that are created recently because they have less chances of being blocked and they are more likely to work in a restricted country. This method aids in identifying the servers that were created recently from among the plurality of VPN servers 120.

One of the server conditions obtained from the server database 116 is the information about the server load for the plurality of VPN servers 120. Each server in the plurality of VPN servers 120 has an attribute called load and it represents the ratio of server capacity used and the theoretical maximum capacity of the server. Naturally, load of a server is quite volatile over time, this means obtaining information on server load is quite resource intensive and dynamic. However, at a particular point in time, the processing unit 114 uses the server load to compute the load weight for each of the servers in the plurality of VPN servers 120. In an example, the expression for determining load weight can be:

Load weight=1; if server load>overload threshold

Load weight=0; if server load≤overload threshold

Here, the overload threshold is 80, it is determined by the server picker infrastructure 110 and can be changed according to the nature and capacity of a server and the network. Through determining the load weight, the overload condition can be known for a particular server in the plurality of VPN servers 120. The logic behind this algorithm is to identify servers that are not overloaded to service the user device 102. One must note that the attribute of load is dynamic, and the unique feature of the current embodiment is that it is able to determine the load weight continuously at a regular time interval according to the changes in the server load.

All the above calculations of determining the several numerical weights for each server in the plurality of VPN servers 120 are carried out by the processing unit 114 in step 217 and returns them to the scoring engine 112 in step 219 thereby satisfying the request made by the Scoring Engine in step 211. All data necessary for computing the numerical weights for each server are obtained from the server database 116. However, one must note that testing module 118 is responsible for testing and gathering the information related to several server conditions. These server conditions are then stored in the server database 116 arranged according to individual servers and later accessed by the processing unit 114.

The scoring engine 112, after receiving the necessary numerical weights for each server in the plurality of VPN servers 120, begins to compute the server penalty score. In step 221, the server penalty score can be calculated, in an example, using the expression:

server penalty score=country weight+hub weight+ time weight+load weight+random value That is, in order to calculate the server penalty score of a server in the plurality of VPN servers 120, the scoring engine 112 adds the different numerical weights of that particular server along with the random value. The random value is significantly a small numerical value in the interval [0, 0.001] and is calculated by the scoring engine 112 using the random value seed. The seed for this random value can be generated through combining multiple attributes, server conditions, and other properties. The main purpose of the random value is to avoid coincidences of server penalty score values. Exemplary values that are used for the random value seed may include server IDs, Unix time value, client application IDs. Here, the client application ID denotes a randomly generated number during the installation of the VPN client application in the user device. Thus, an example of an expression for generating the random value seed for determining the random value can be as follows:

random value seed=(server ID+client application ID+unix time)

The random value is calculated using the above generated seed by the scoring engine 112. Therefore, an example of an expression for calculating the random value can be as follows:

random value=(random value seed)/1000 e.g., random value=(server ID+client application ID+unix time)/1000

After calculating the server penalty score in the above manner for each server in the plurality of VPN servers 120, the scoring engine 112 in step 223 arranges the IP addresses of the plurality of VPN servers 120 according to the server penalty score in an ascending order. In step 225, the scoring engine 112 identifies the optimal VPN server from the scored list of servers. The server with the lowest server penalty score is the optimal VPN server and in step 227 the Scoring engine 112 provides the IP address of the optimal VPN server to the API 106. In step 229, the API 106 forwards the IP address of the optimal VPN server to the user device 102 and in step 231 the user device 102 establishes the encrypted VPN connection with the optimal VPN server from among the plurality of VPN servers 120.

In some situations, the user device 102 may not be able to connect to the optimal VPN server. There can be several reasons why the user device 102 could not connect to the optimal VPN server including that the optimal VPN server is blocked to the user device 102, is blocked to user devices connecting to the Internet from the ISP that the user device 102 is using to access the internet, the connection between the user device 102 and the optimal VPN server is so unstable that it could not be maintained without disruptions to the user, or some other reason.

To mitigate against such situations, in response to the user device 102 requesting the IP address (which can also include an IP port) of a VPN server to establish a VPN connection, as described with respect to step 207 of FIG. 2A, the VPN service provider infrastructure 104 (and more specifically, the API 106) may receive from the scoring engine 112 a list of VPN servers that includes a predetermined number of optimal servers (e.g., 5, 10, fewer, or more VPN servers). Receiving a list of VPN servers can mean or include receiving connection information (e.g., respective IP addresses, or respective IP addresses and IP ports) for the VPN servers. Instead of returning one VPN server (i.e., the optimal VPN server) as described with respect to steps 225-227 of FIG. 2A, the scoring engine 112 returns a list of VPN servers to the API 106. In an example, the scoring engine 112 returns the whole list of available VPN servers sorted in ascending order according to the respective server penalty scores. As such, the optimal VPN server would be related to the first VPN server on the list. As further described with respect to FIG. 3, if the user device 102 cannot establish a connection with (i.e., using the connection information related to) the optimal VPN server, then the user device 102 can request, from the API 106, the IP address (and/or IP port) of the next VPN server on the list of VPN servers; if the user device 102 cannot establish a connection with the next provided VPN server, then the user device 102 requests the IP address (and/or IP port) of the next VPN server; and so on. For brevity, references to an IP address should be understood to also include an IP port, unless otherwise understood from the context.

Figure 3:
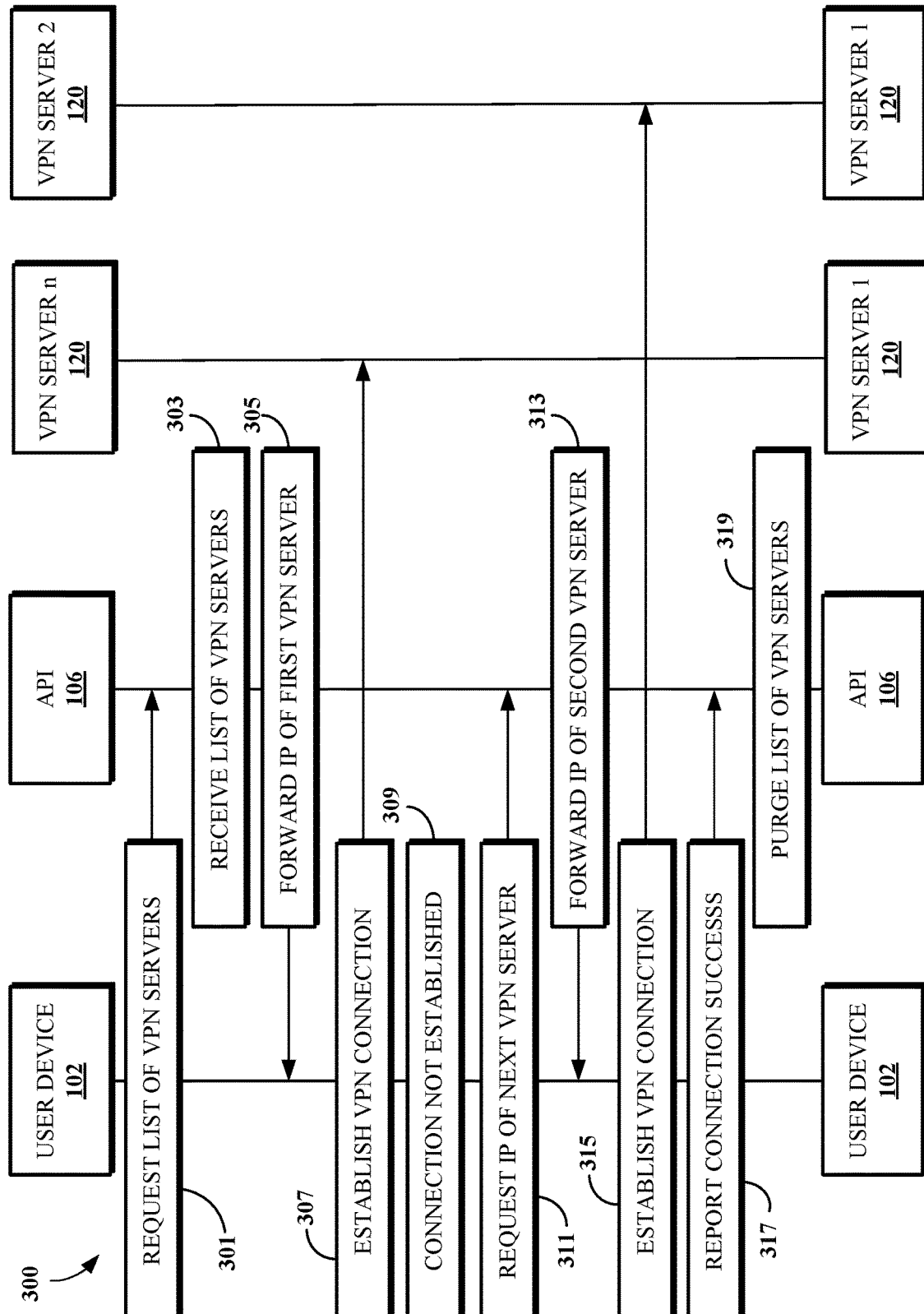

FIG. 3 is a flow diagram 300 of an example of the operations of iteratively requesting a next VPN server to connect to. FIG. 3 includes the user device 102, which obtains VPN servers (i.e., IP addresses and/or IP ports of VPN servers) to attempt to establish VPN connections to. For brevity, some steps described with respect to FIGS. 2A-2B are omitted from the flow diagram 300. For example, before requesting connection information (e.g., IP addresses and/or IP ports) of VPN servers to connect to, the user device 102 may authenticate itself with the VPN service provider infrastructure 104, as described with respect to steps 201-205.

At step 301, the user device 102 requests a list of VPN servers (i.e., a list of IP addresses and/or IP ports of VPN servers). At step 303, the API 106 may receive a list of VPN servers from the scoring engine 112 (not shown). While described above with respect to step 227 of FIG. 2B that the scoring engine 112 provides the IP address and/or IP port of the optimal VPN server to the API 106, herein, the scoring engine 112 provides a list of VPN servers that is sorted by server penalty score. Thus, the list of VPN servers may be sorted in ascending order by the respective server penalty scores of the VPN servers on the list of VPN servers. The API 106 may cache (e.g., temporarily store) the list of VPN servers. The API 106 may cache the list of VPN servers for a predetermined period of time (e.g., 2 minutes, 5 minutes, or some other predetermined period of time) or until the API 106 implicitly or explicitly receives an indication from the user device 102 that the user device 102 has successfully established a VPN connection with a VPN server, as further described with respect to step 317. An implicit indication may be received if the API 106 determines that no request for a next VPN server on the list of VPN servers is received from the user device 102 within a certain time window. An explicit indication can be as described below with respect to step 317.

The API 106 may treat the list of VPN servers as a queue. Thus, when a request for a VPN server is received from the user device 102, the API 106 pops the head (i.e., the first VPN server on the list) off the queue and returns the popped head of the queue to the user device 102. As such, the VPN server that was the second server on the list prior to the popping action, becomes the head of the queue after the popping action. At step 305, the API 106 forwards the IP address of the head of the queue (i.e., the current first VPN server on the list, which is the optimal VPN server to the user device 102). FIG. 3 illustrates that the first server on the list of servers is VPN server n 120. As such, at step 307, the user device 102 attempts to establish a VPN connection (e.g., establish an encrypted tunnel) with the VPN server n 120 (i.e., the IP addresses and/or IP ports of the VPN server received from the API 106).

While not specifically shown in FIG. 3, if a connection is established, then the flow diagram 300 resumes at 317. However, the scenario illustrated in FIG. 3 is that no connection is successfully established, at step 309, and the flow diagram 300 proceeds to step 311. At step 311, the user device 102 requests, from the API 106, a next VPN server to attempt to establish a connection to. At step 313, the API 106 returns the next VPN server to the user device 102, which is illustrated to be the VPN server 2 120. At step 315, the user device 102 attempts to establish a VPN connection to the VPN server provided by the API 106. The flow diagram 300 illustrates that the user device 102 successfully established a connection with the VPN server 2 120. As such, at step 317, the user device 102 transmits an indication to the API 106 that the user device has successfully connected to the VPN server provided by the API 106.

While the flow diagram 300 illustrates that the user device 102 made two requests (i.e., at steps 301 and 311) for VPN servers from the API 106, as can be appreciated, the steps 311-315 can be repeated until a connection with a VPN server is established or until there are no more servers available in the list of servers maintained by the API 106.

Accordingly, an aspect of the disclosed implementations is a technique that may be implemented by a user device. The technique can include transmitting a VPN servers request (i.e., a request for one or more VPN servers) from the user device and to a central server. A first VPN server may be received from the central server at the user device. Responsive to the user device failing to establish a first encrypted tunnel with the first VPN server, a request for another VPN server may be transmitted to the central server. A second VPN server can be received from the central server. The user device can establish a second encrypted tunnel with the second VPN server. The user device can encrypt, to obtain an encrypted communication, a communication that is to be directed to a network server. The encrypted communication can be transmitted from the user device to the VPN second server.

In an example, data (i.e., success connectivity data) can be transmitted to the central server indicating that the user device failed to establish the first encrypted tunnel. In an example, data (i.e., success connectivity data) can be transmitted to the central server indicating that the user device successfully established the second encrypted tunnel. In an example, the first VPN and the second VPN server may correspond to different physical devices. In an example, they may be the same physical server. For example, the first VPN server can include an internet protocol (IP) address and a first port number, and the second VPN server can include the same IP address and a second port number that is different from the first port number.

In another aspect, the user device may send a VPN servers request to a central server. The user device may receive a list of VPN servers from the central server. Responsive to the user device failing to establish a first connection to a first VPN server of the list of VPN servers, the user device establishes a second connection with a second VPN server of the list of VPN servers. The list of VPN servers may include multiple IP addresses for a single physical (or virtual server); similarly, the list of VPN servers may include multiple IP ports for a single physical (or virtual) server. Each IP address or IP address and IP port combination is considered a separate VPN server in the list of VPN servers. To illustrate, the list of VPN servers may include an IP address of 169.125.1.1 and associated IP ports 223 and 5223, and IP address 168.0.0.1 and associated IP ports 220, 222, and 225. As such, the list of VPN servers includes a total of 6 VPN servers.

Figure 4:
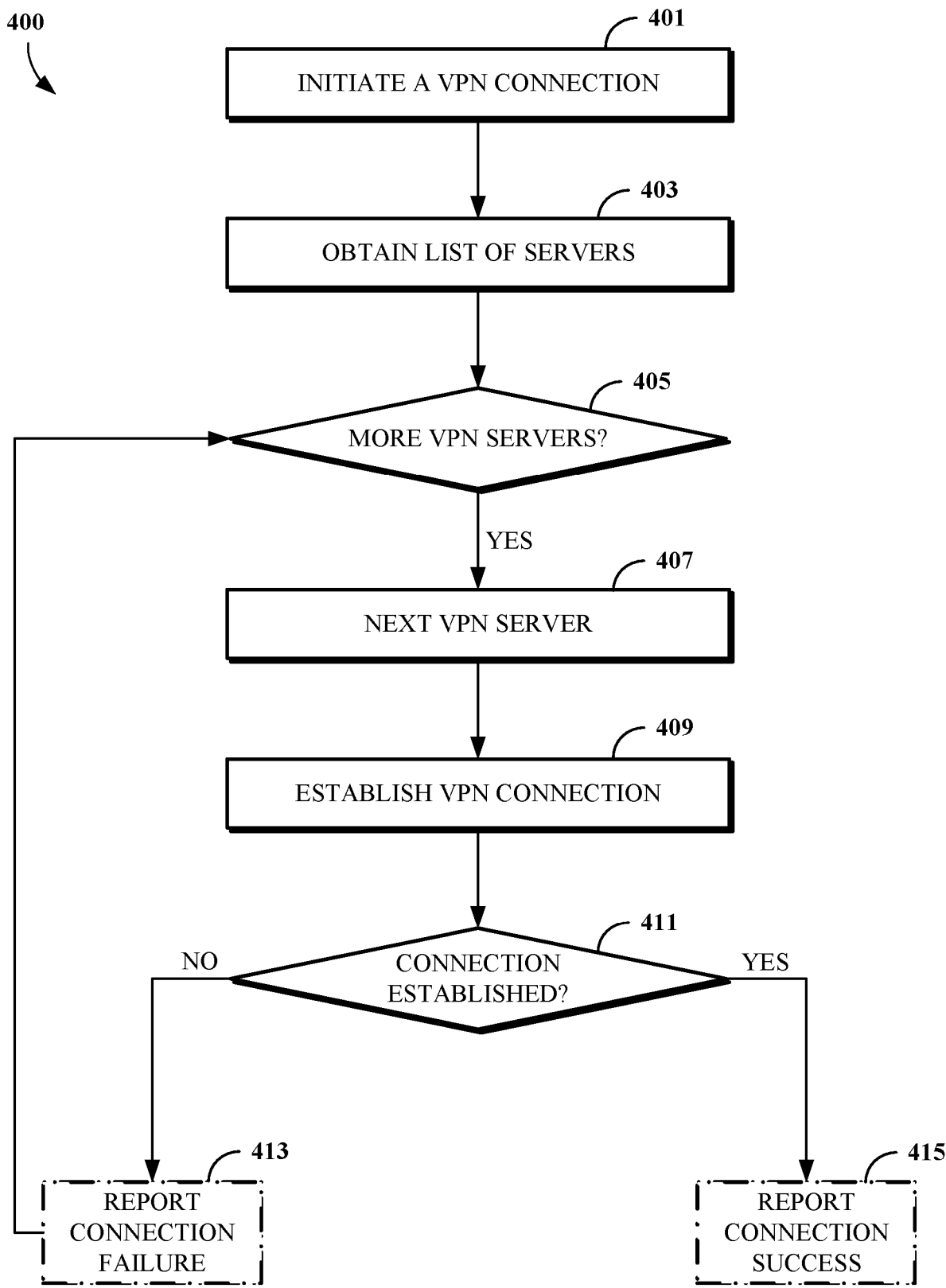
FIG. 4 is a flowchart of an example of a technique for obtaining a list of VPN servers.

In FIG. 3, the user device 102 requests a next VPN server from the API 106. In another implementation, and as described with respect to FIG. 4, the user device 102 can obtain multiple VPN servers (i.e., the list of VPN servers) from the API 106 and need not request a next VPN server from the API 106. FIG. 4 is a flowchart of an example of a technique 400 for obtaining a list of VPN servers. For brevity, the flowchart omits steps described with respect to FIGS. 2A-2B and 3.

The technique 400 can be implemented by a user device, such as the user device 102 of FIG. 1. The technique 400 can be implemented, for example, as a software program that may be executed by computing devices such as the computing system 800 of FIG. 8. The software program can include machine-readable instructions that may be stored in a memory such as the memory 808 or the computer readable medium 806 of FIG. 8, and that, when executed by a processor, such as the one or more processors 802 of FIG. 8, may cause the computing device to perform the technique 400. The technique 400 can be implemented using specialized hardware or firmware. Multiple processors, memories, or both, may be used.

At step 401, the user device initiates a VPN connection, which can be as described with respect to step 207 of FIG. 2A. At step 403, a list of VPN servers (i.e., connection information related to the VPN servers including IP addresses and/or IP ports) may be obtained (e.g., received) at the user device. The list of VPN servers can be the list described with respect to step 303 of FIG. 3. As such, instead of or in addition to caching the list of VPN servers, the API 106 may transmit the list of VPN servers to the user device. In the steps 405-411, the technique 400 iterates through the VPN servers on the list until a connection is established or until there are no more VPN servers on the list to attempt to connect to, whichever comes first.

At step 405, the technique 400 determines whether there are more VPN servers in the list of VPN servers. If so, then the technique 400 proceeds to step 407 to retrieve the next VPN server from the list; otherwise, the technique 400 ends (not shown). The technique 400 may present an error message to the user of the user device indicating that no VPN connection could be established. As mentioned above, the list of VPN servers may include multiple IP addresses associated with a single physical (or virtual) server and multiple IP ports may also be associated with each IP address. Each combination of IP address and IP port is considered a VPN server in the list of VPN servers. At step 409, the user device attempts to establish a connection with the retrieved VPN server. At step 411, the technique 400 determines whether a connection was successfully established between the user device and the VPN server. If a connection was not successfully established, then the technique 400 proceeds back to step 405. If a connection was successfully established, then the technique 400 may end. The technique 400 may display or cause to be displayed on a display of the user device a message, a status indicator, or the like indicating that a VPN connection is successfully established.

In an implementation, the technique 400 may include at least one of the steps 413 or 415. At step 413, an indication may be transmitted to the API 106 that the user device was not able to establish a connection to the VPN server. At step 415, an indication may be transmitted to the API 106 that the user device was able to establish a connection to the VPN server. In an example, the technique 400 may not include the step 413.

As already alluded to, the API 106 can store or cause to be stored in a database, such as the server database 116 of FIG. 1, data regarding whether user devices successfully or unsuccessfully connected to provided VPN servers (referred to herein as "success connectivity data"). For example, in response to receiving a request for a next VPN server from the list of VPN servers, such as at step 311 of FIG. 3, the API 106 can infer that the user device 102 was not able to establish a connection with the previously provided VPN server. The API 106 can receive an explicit indication that the user device 102 was not able to establish a connection with a VPN server, such as described with respect to step 413 of FIG. 4. In another example, in response to receiving an indication that the user successfully connected to a VPN server, the API 106 can infer that the user device was not able to successfully connect to other VPN servers of the list of servers and provide connection information of a VPN server having lower server penalty scores. The API 106 can store or cause to be stored success connectivity data indicating that the user device could not establish a connection with the VPN server. Additionally, in response to receiving an indication that the user device has successfully connected to the VPN server provided by the API 106, the API 106 can store or cause to be stored success connectivity data indicating that the user device established a connection with the VPN server.

In some implementations, the API 106 can store or cause to be stored in the database VPN server connection data by ISP (referred to herein as "ISP data"). For example, the ISP of the user device can be obtained using the IP address of the user device 102. The API 106 may forward the IP address of the user device 102 to a third-party service that can provide information regarding the ISP associated with the IP address of the user device 102. As already mentioned, an ISP is an entity that provides services for accessing, using, or participating on the Internet.

As such, over time, the database can include more and more ISP data that can be used to determine (e.g., infer) whether a user device can establish a connection with a particular VPN server based on the ISP of the user device. The ISP data can include data (e.g., records) indicating geolocations from which user devices could and could not establish connections to particular VPN servers. Each record can include a respective timestamps of the time that it was stored in the server database 116. In some implementations, the scoring engine 112 can use the ISP data in the calculations of the server penalty scores. To illustrate, if all ISP data indicate that no connection from any user device from a particular geolocation that uses a particular ISP successfully established a connection to a particular VPN server, then the scoring engine 112 may infer that no future user devices from the geolocation using the particular ISP may be able to establish a connection to the particular VPN server and the scoring engine 112 can adjust the server penalty score of the particular VPN server accordingly. In some implementations, the processing unit 114 or the scoring engine 112 can use the ISP data to obtain the optimal VPN server or the list of VPN servers.

Figure 5:
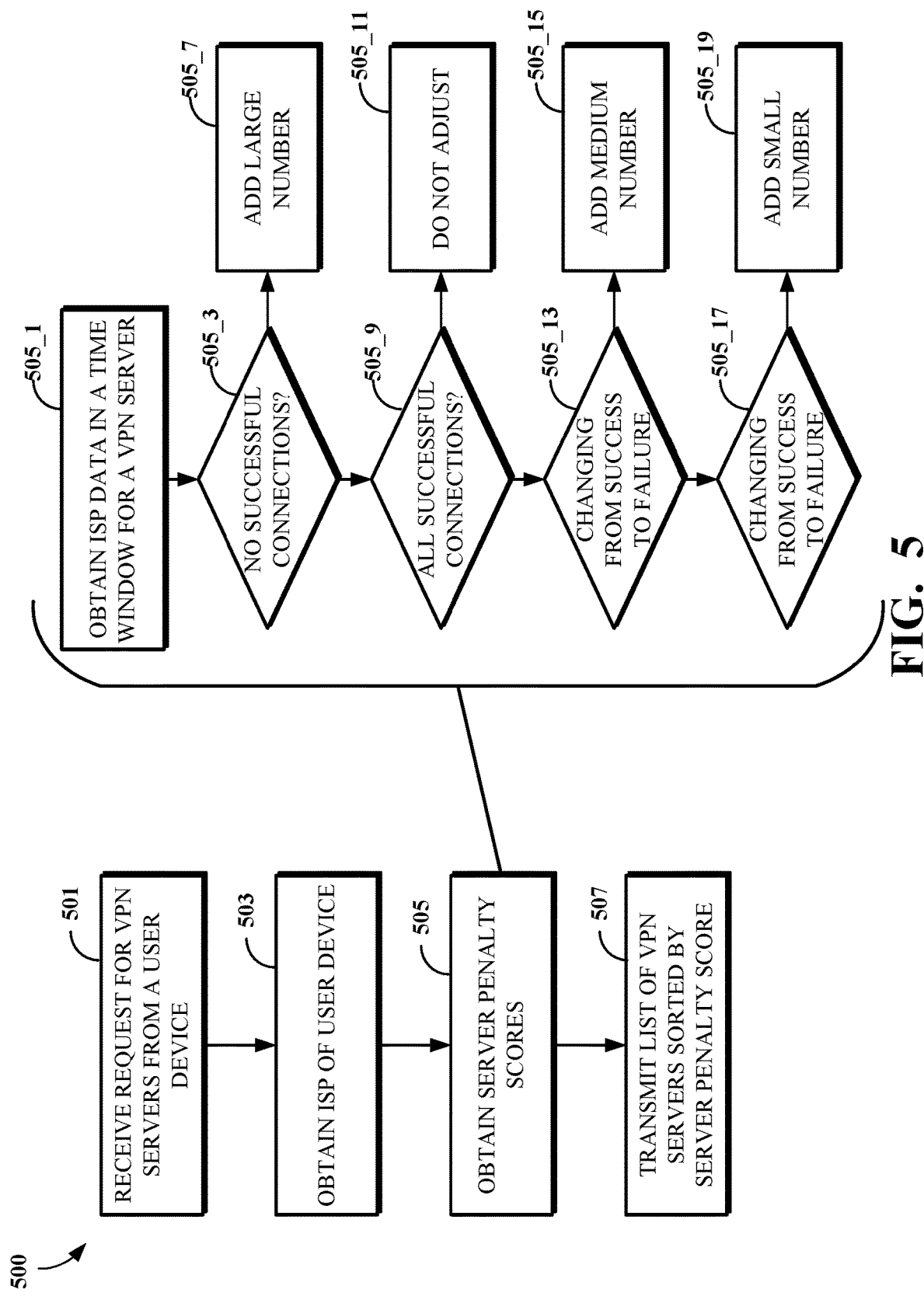
FIG. 5 is a flowchart of an example of a technique for adjusting server penalty scores based on ISP data.

FIG. 5 is a flowchart of an example of a technique 500 for adjusting server penalty scores based on ISP data. The technique 500 can be implemented by the VPN service provider infrastructure 104 of FIG. 1 and can be partially implemented by a processing unit 114 or the scoring engine 112 of FIG. 1. The technique 500 can be implemented, for example, as a software program that may be executed by computing devices such as the computing system 800 of FIG. 8. The software program can include machine-readable instructions that may be stored in a memory such as the memory 808 or the computer readable medium 806 of FIG. 8, and that, when executed by a processor, such as the one or more processors 802 of FIG. 8, may cause the computing device to perform the technique 500. The technique 500 can be implemented using specialized hardware or firmware. Multiple processors, memories, or both, may be used At step 501, a request for VPN servers is received. The request may be received from a user device, which can be the user device 102 of FIG. 1. The request for the VPN servers can be as described above. At step 503, the ISP of the user device is obtained, such as described above. At step 505, respective server penalty scores are obtained. The server penalty scores can be obtained as described above in addition to being adjusted based on ISP data as described with respect to steps 505_1 to 505_19, which add an ISP adjustment value to the server penalty score. As such the server penalty score is then calculated as:

server penalty score=country weight+hub weight+ time weight+load weight+random value+ISP adjustment value To calculate the ISP adjustment value for a VPN server, at step 505_1, ISP data is obtained from the server database 116. The ISP data can be obtained from the server database 116 based on the ISP, the geolocation of the user device, and the VPN server. The obtained ISP data can include, or can be processed/analyzed to include, frequencies and trends of successful and unsuccessful connections from user devices within the geolocation and that use the same ISP to the VPN server. In an example, the ISP data is obtained for a most recent time window (e.g., 1 day, 1 week, 1 month, or some other time window). Since an ISP may block (or unblock) connectivity to a VPN server from a geolocation, more recent data regarding connectively to the VPN server from a geolocation is more informative and determinative than older data.

At step 505_3, if the ISP data does not include any successful connections, then the server penalty score can be increased significantly. As such, at the step 505_7, a large ISP adjustment value can be added to the server penalty score. In an example, the large ISP adjustment value can be a large constant (e.g., 20, 30, 100, etc.) or a random large value that may be between, for example, 20 and 30 (e.g., ISP adjustment value=rand_between(20, 30)), or in some other range. In an example, the large ISP adjustment value can be so large (e.g., 10000) so as to effectively exclude the VPN server from the list of VPN servers.

At step 505_9, if the ISP data includes only successful connections, then at 505_11, the server penalty score is not adjusted. As such, ISP adjustment value=0.

At step 505_13, if the ISP data indicates a changing trend from successful connections to a consistent inability (e.g., failure) to connect, then the ISP data may indicate that the VPN server may have become blocked by the ISP. Accordingly, at step 505_15, a medium ISP adjustment value can be added to the server penalty score. A medium ISP adjustment value is added, as opposed to a large ISP adjustment value, to account for the possibility that the inference that the VPN server has become blocked is inaccurate. The medium ISP adjustment value can be a large constant (e.g., 10, 20) or a random medium value that may be between, for example, 10 and 20 (e.g., ISP adjustment value=rand_between(10, 20)).

At step 505_17, if the ISP data indicates a changing trend from unsuccessful connections to a consistent ability (e.g., success) to connect, then the ISP data may indicate that the VPN server may have become unblocked by the ISP. Accordingly, at step 505_19, a small ISP adjustment value can be added to the server penalty score. A small ISP adjustment value is added, as opposed to a medium ISP adjustment value, to account for the possibility that the inference that the VPN server has become unblocked is inaccurate. The small ISP adjustment value can be a small constant (e.g., 5, 10) or a random small value that may be between, for example, 5 and 10 (e.g., ISP adjustment value=rand_between(5, 10)).

In some situations, the list of VPN servers determined and ordered (i.e., sorted) by the VPN service provider infrastructure 104 may not be optimally ordered based on an intended network usage of the user device. The "intended network usage of the user device" refers to the main purpose that the user is establishing the VPN connection or a type of application that the user intends to use after the VPN connection is established. The intended network usage of the user device may be obtained from the user. For example, a user interface (not shown) may be presented to the user on the user device, which enables the user to select an option (from amongst a list of options) indicative of the intended network usage of the user device.

Examples of intended network usages include a streaming usage, a gaming usage, a real-time communications usage, a downloading usage, or an uploading usage. Other intended network usages are possible. The streaming usage includes continuously receiving (from a server and via a VPN server) and playing audio or video files at the user device, such as in the case of movie watching. The gaming usage can include online (e.g., over the internet) interactions (i.e., transmission and receipt of audio data, video data, or commands) between the user device and the devices of other users. The interactions may be facilitated (e.g., intermediated) by an online gaming server with which the user device communicates via a VPN server. The real-time communications usage may include a video chat session, a virtual conferencing session, or the like between 2 or more users. The downloading usage refers to the copying of one or more files from the Internet to the user device. The uploading usage refers to the copying of one or more files from the user device to another device on the Internet.

Different network conditions (e.g., connection conditions between the user device and a VPN server) may be preferable for the different intended network usages. A few illustrations are provided next.

Low latency may be preferable in the case of gaming. While latency of 100 milliseconds (ms) may be acceptable, latencies of 50 ms or 30 ms may be more preferable. A latency of 20 ms may be considered the most optimal. Latency may be referred to as a ping rate and may be measured by sending ping requests from the user device to a VPN server to measure the round-trip latency between the user device and the VPN server.

On the other hand, bandwidth (and equivalently, download speed) may be a more relevant network measure than latency in the case of the streaming usage. Bandwidth can be measured in terms of upload speed and download speed. Download speed refers to how fast data can transfer from a VPN server to the user device; and upload speed refers to how fast data can transfer from the user device to a VPN server. Upload and download speeds may be measured in megabits per second or Mbps. Low download speed can manifest in the form buffering at the user device or as lower (e.g., video) quality as the streaming server attempts to compensate for a slow download speed. The user device can perform speed tests to measure the upload speed, the download speed, or both, between the user device and a VPN server.

Download speed may be a most relevant network statistic in the case of the downloading usage; however, the download statistic may not be as important as in the case of streaming usage. Upload speed may be a most relevant network statistic in the case of the uploading usage. And, in the case of real-time communications, a combination of low latency, high upload speed, and high download speed may be preferable.

Figure 6:
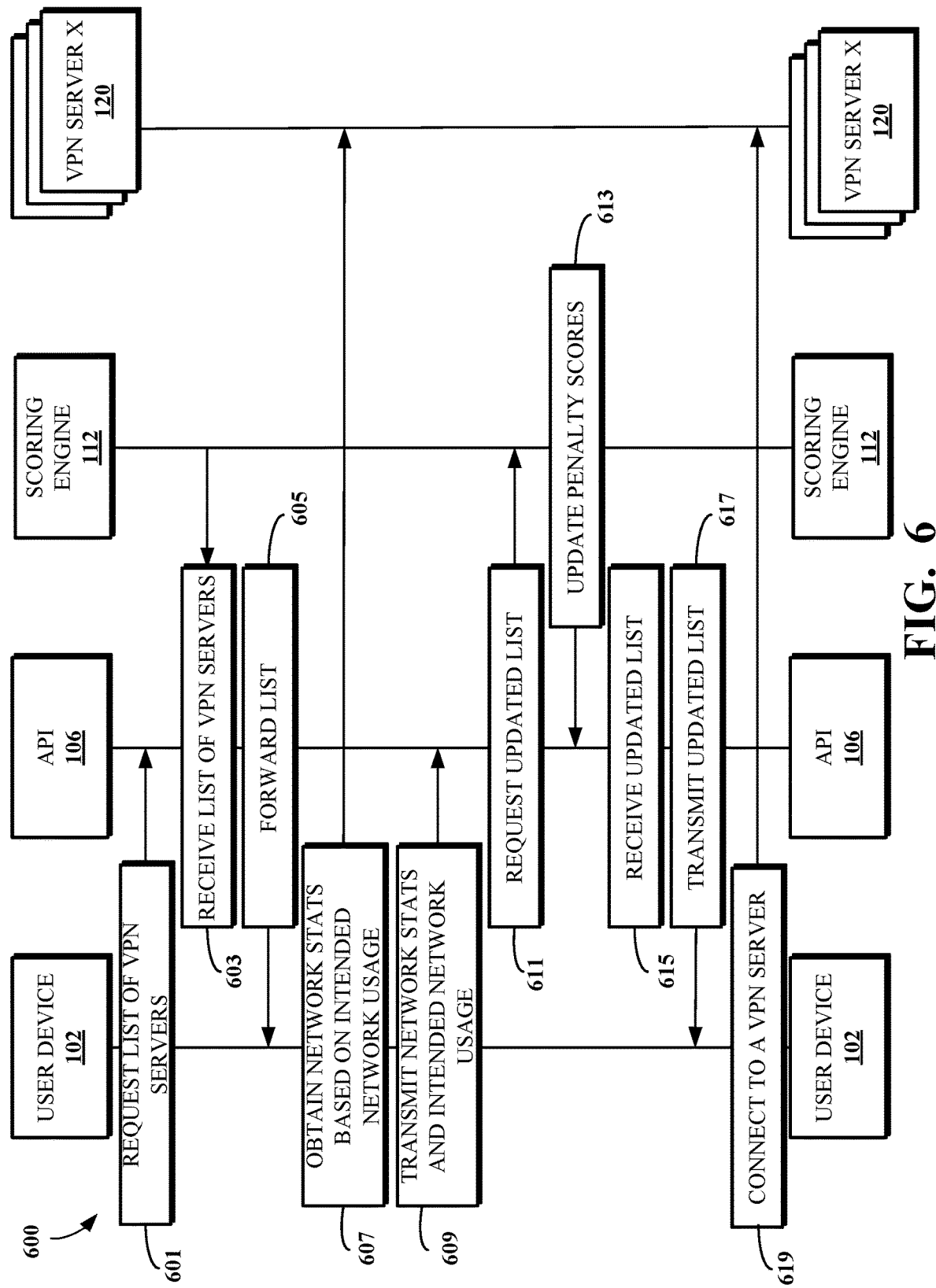
FIG. 6 shows an example of a flow diagram of the operations of identifying VPN servers based on an intended network usage.

FIG. 6 shows an example of a flow diagram 600 of the operations of identifying VPN servers based on an intended network usage. At step 601, the user device 102 requests a list of VPN servers (i.e., a list of IP addresses of VPN servers) from the API 106. At step 603, the API 106 obtains from the scoring engine 112 a list of VPN servers, as described above. The list of VPN servers may be sorted according to the respective server penalty scores of the VPN servers. At step 605, the API 106 forwards the list of VPN servers to the user device 102.

At step 607, the user device 102 obtains respective network statistics for at least some (e.g., top 5, top 10, all) of the VPN servers of the list of servers. The network statistics obtained may be based on the intended network usage. While not specifically shown in FIG. 6, the flow diagram 600 may include steps for obtaining the intended network usage, as described above. Obtaining the network statistics based on the intended network usage may include performing one or more network tests that are specifically relevant to the intended network usage. To illustrate, in the case that the intended network usage is a streaming usage, the user device 102 may send only ping requests to each of the at least some of the VPN servers of the list of servers. The user device 102 may perform the network tests in series (e.g., to one VPN server at a time) or in parallel (e.g., to all of the VPN servers at the same time).

At step 609, the user device 102 transmits the respective test results and the intended network usage to the API 106. At step 611, the API 106 requests that the scoring engine 112 update (e.g., reorder the list of VPN servers) based on the received test results and the intended network usage, which the API 106 includes in the request to the scoring engine 112. The user device 102 may not have received responses for ping requests to some of the VPN servers. Similarly, the user device 102 may not be able to obtain upload or download speeds. As such, the test results may include respective large speed (e.g., practically infinite) values. Sometimes, upload and download bandwidth may be measured in megabits per second (Mpbs). As such, the test results may include values of 0 for VPN servers that the user device 102 could not reach.

At step 613, the scoring engine 112 updates the server penalty scores based on the received test results and the intended network usage. Several techniques are available for updating the serve penalty scores based on the rest results.

In an example, and in the case of the gaming usage, the respective server penalty scores may be multiplied by a respective normalized latency factor. For example, if the list of servers includes M VPN servers and the test results include a respective latency value L1 for the VPN servers, then the server penalty score of the $i^{th}$ VPN server can be updated using:

$$\text{server penalty score} = \frac{L_i}{\sum_{1}^{M} L_j} (\text{server penalty score})$$

In an example, and in the case of the streaming usage, the server penalty scores can be similarly updated. For example, if the list of servers includes M VPN servers and the test results include a respective download speed (or bandwidth) value $D_j$ for the VPN servers, then the server penalty score of the $i^{th}$ VPN server can be updated using:

$$\text{server penalty score} =$$
$$\frac{\max(D_j, j = 1, \ldots, M) - D_i + rand(0, 0.001)}{\sum_{1}^{M} D_j} (\text{server penalty score})$$

The above formula reflects the fact that higher download values are better than lower download values. Thus, higher download values should result in lower multiplication factors than lower download values. The function rand(0, 0.001) returns a random value between, but not including, 0 and 0.0001. This term is used so that the multiplication factor for the VPN server associated with $\max(D_j, j=1, \ldots, N)$ does not equal to zero.

In an example, and in the case of real-time communications usage, the server penalty scores may be updated based on a factor that is a weighted sum of the respective latencies L1, download speeds (or bandwidths) $D_j$, and upload speeds (or bandwidths) $U_j$ using:

server penalty score =

$$\left( \alpha \frac{L_i}{\sum_{1}^{M} L_j} + \beta \frac{\max(D_j, j = 1, \ldots, M) - D_i + rand(0, 0.001)}{\sum_{1}^{M} D_j} + \gamma \frac{\max(U_j, j = 1, \ldots, M) - U_i + rand(0, 0.001)}{\sum_{1}^{M} U_j} \right) (\text{server penalty score})$$

In the above formula, $\alpha$, $\beta$, and $\gamma$ are constants that may be empirically derived. In the case of the upload usage, the server penalty score can be updated using $$\frac{\max(U_j, j = 1, \ldots, M) - U_i + rand(0, 0.001)}{\sum_{1}^{M} U_j};$$

and in the case of the download usage, the server penalty score can be updated using $$\frac{\max(D_j, j = 1, \ldots, M) - D_i + rand(0, 0.001)}{\sum_{1}^{M} D_j}.$$

The constants may be adapted to particular conditions or situations. For example, one or more of the $\alpha$, $\beta$, or $\gamma$ constants may be set to zero to exclude the corresponding term for the above calculations.

At step 615, the API 106 receives an updated list (e.g., reordered list) of VPN servers from the scoring engine 112. At step 617, the API 106 transmits the updated list of VPN servers to the user device 102. At step 619, the user device 102 can establish a connection with one of the VPN servers of the updated list. Establishing a connection with one of the VPN servers of the updated list can be as described with respect to steps 405-415 of FIG. 4. In another example, the updated list of VPN servers may not be transmitted to the user device 102. Rather, and as described with respect to FIG. 3, only one VPN server may be transmitted at a time to the user device 102. If the user device 102 cannot establish a connection with a VPN server, then the user device 102 requests another VPN server from the API 106.

In an example, and similar to the steps 413 and 415 of FIG. 4, the user device 102 can transmit success connectivity data to the API 106 indicating whether the user device 102 was successful or not successful in establishing connections to VPN servers in the updated server list. In an example, the user device 102 can transmit the intended network usage of the user device 102 and the particular VPN server that the user device 102 established a connection to, which the API 106 can store or cause to be stored in a database. The data stored in the database can indicate that a user device in the geolocation of the user device 102 successfully established a connection to the particular VPN server for the particular intended network usage. In some implementations, the processing unit 114 or the scoring engine 112 can use such information to obtain the optimal VPN server or the list of VPN servers.

As such, over time the database can include data (referred to herein as "network usage data") regarding which VPN servers were connected to, from which geolocations, and for which intended network usages. Such data can be used, for example, to obtain analytics including statistics regarding which servers are being connected from which geolocations, where VPN servers should be added or capability increased, and the like.

In an implementation, the user device may store an association between the VPN server that the user device connected to the step 619 and the intended network usage. A creation timestamp (e.g., a date) of the connection may be stored with the association. As such, in response to the user, at a later time, indicating the same intended network usage, the same (i.e., stored) VPN server may be used and the user device need not obtain a VPN server to connect to, as described with respect to FIG. 5. In the case that the user device is not able to connect (i.e., fails to connect or the connection is unstable) to the stored VPN server, then the user device can obtain a VPN server as described with respect to FIG. 5. In an example, the user may cause a bypass of the stored VPN server and the obtaining of a VPN server as described with respect to FIG. 5. In another example, using the stored VPN server may be bypassed if the association between the VPN server and the intended network usage is determined to be stale. The association is deemed stale if it was created more than a threshold amount of time (e.g., 1 week, 2 week, or some other number of weeks or days). That is, a stale association is such that threshold time≤(current timestamp−creation timestamp).

Figure 7:
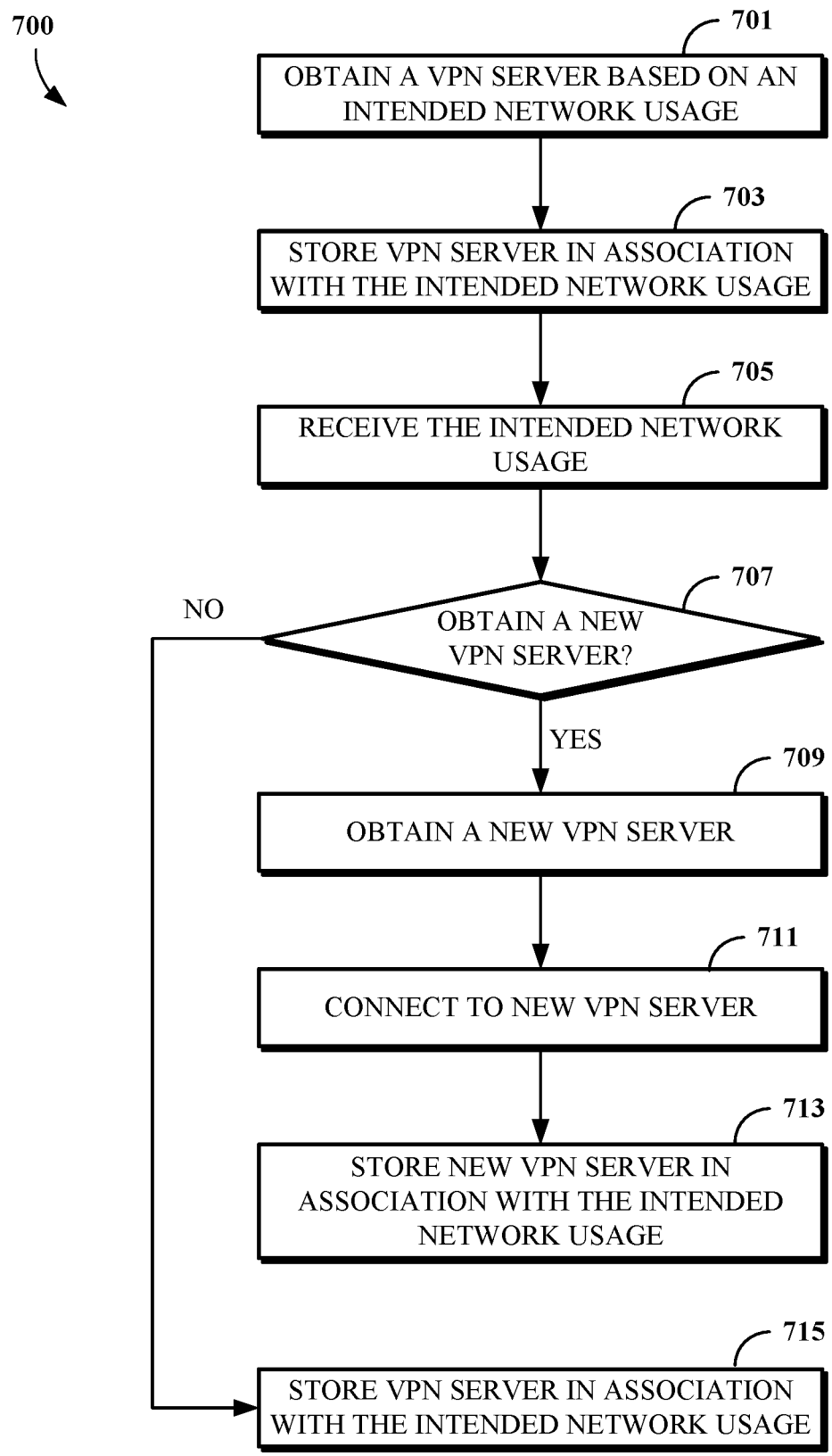
FIG. 7 is a flowchart of an example of a technique for connecting to a VPN server based on an intended network usage.

Accordingly, FIG. 7 is a flowchart of an example of a technique 700 for connecting to a VPN server based on an intended network usage. The technique 700 can be implemented by a user device, such as the user device 102 of FIG. 1. The technique 700 can be implemented by a user device, such as the user device 102 of FIG. 1. The technique 700 can be implemented, for example, as a software program that may be executed by computing devices such as the computing system 800 of FIG. 8. The software program can include machine-readable instructions that may be stored in a memory such as the memory 808 or the computer readable medium 806 of FIG. 8, and that, when executed by a processor, such as the one or more processors 802 of FIG. 8, may cause the computing device to perform the technique 700. The technique 700 can be implemented using specialized hardware or firmware. Multiple processors, memories, or both, may be used.

At 701, a VPN server is obtained based on an intended network usage. In an example, the intended network usage may be obtained as described above, such as from the user of the user device. The VPN server can be obtained as described with respect to FIG. 6. At 703, an association between the VPN server and the intended network usage may be stored, with an associated timestamp, in the user device. At 705, which may be later in time (e.g., hours later, days later, or some other later time), the technique 700 may receive the intended network usage, again. For example, the user of the user device may be attempting to establish a new VPN connection and the user provides the intended network usage therewith. In an example, the user (or user device) may be at the same geolocation as when then intended network usage was previously used. As such, the same previously stored VPN server may be reused.

At 707, the technique 700 determines whether to obtain a new VPN server. The technique 700 determines to obtain a new VPN server under several conditions, as described above. In an example, a new VPN server is to be obtained if the user device cannot establish a connection with the VPN server, which includes that the connection is established but is unstable. In another example, a new VPN server is to be obtained if an indication is received from the user to obtain a new VPN server. In another example, a new VPN server is to be obtained in a case where the association is stale. As such, in an example, determining not to use the VPN server can include determining not to use the VPN server responsive to determining that the association between the intended network usage and the VPN server is stale; in another example, determining not to use the VPN server can include determining not to use the VPN server responsive to determining that a connection cannot be established with the VPN server; and yet another example, determining not to use the VPN server can include determining not to use the VPN server responsive to receiving a request from a user to obtain the new VPN server.

Regardless of the reasons for determining whether a new VPN server is to be obtained, if a new VPN server is to be obtained, then the technique 700 proceeds to 709; otherwise, the technique 700 proceeds to 715 to connect to the stored VPN server. At 709, a new VPN server is obtained, such as described with respect to FIG. 6. At 711, the user device connects with the new VPN server. In an example, obtaining the new VPN server from the central server can include receiving a list of VPN servers from the central server. Respective network data can be obtained for the VPN servers. The respective network data can be transmitted to the central server.

At 713, an association between a new VPN server and the intended network usage is stored in the user device (e.g., a storage of the user device).

In an example, more than one association between the intended network usage and VPN servers may be stored in the user device. As such, the user device may determine to connect to at least some of the VPN servers associated with the intended network usage before obtaining a new VPN server from the VPN service provider infrastructure 104 of FIG. 1.

In an example, the technique 700 can further include, responsive to determining to use the VPN server, connecting to the VPN server.

In accordance with FIG. 6, an aspect of the disclosed implementations that may be executed by a user device, such as the user device 102 of FIG. 1, includes receiving an intended network usage of a user device. A list of VPN servers may be received at the user device from a central server. Respective network data may be obtained for the VPN servers. The respective network data may be transmitted to the central server. An updated list of VPN servers may be obtained (e.g., received) at the user device from the central server. The updated list of VPN servers can be a re-ordering of the list of the VPN servers according to the respective network data and the intended network usage. The user device can then establish an encrypted tunnel to a VPN server of the updated list of VPN servers.

In an example, the intended network usage indicates a gaming mode, and obtaining the respective network data for the VPN servers can include transmitting respective ping requests to the VPN servers to obtain at least some of the respective network data. In an example, the intended network usage indicates a streaming mode, and obtaining the respective network data for the VPN servers can include transmitting respective download requests to the VPN servers to obtain at least some of the respective network data. In an example, the intended network usage indicates a real-time communications mode, and obtaining the respective network data for the VPN servers can include transmitting respective ping requests to the VPN servers to obtain at least some of the respective network data and transmitting respective upload and download requests to the VPN servers to obtain at least some of the respective network data.

In another aspect, a user device receives an intended network usage of a user device, such as described above. In an example, the intended network usage of a user device may be received from a user of the user device. The user device receives a list of VPN servers from a central server. The user device identifies, based on the intended network usage, a VPN server to establish an encrypted tunnel to the VPN server from amongst the VPN servers of the list of VPN servers. The user device then establishes the encrypted tunnel to the VPN server.

Embodiments disclosed herein relate to the field of methods and systems for identifying and connecting to a VPN server, including connecting to an optimal VPN server, consistently from among a plurality of servers. Generally, the embodiments are related to virtual private network (VPN) technologies featuring a dynamic logical system that enables VPN applications to identify and establish a connection with a VPN server form among a plurality of VPN servers. Moreover, the disclosure presents methods and systems for efficiently evaluating and scoring a plurality of VPN servers. However, it is to be noted that the embodiments are relatable and functionable to other like applications where there is a need for identifying a VPN server (e.g., an optimal VPN server) from among a plurality of servers.

Figure 8:
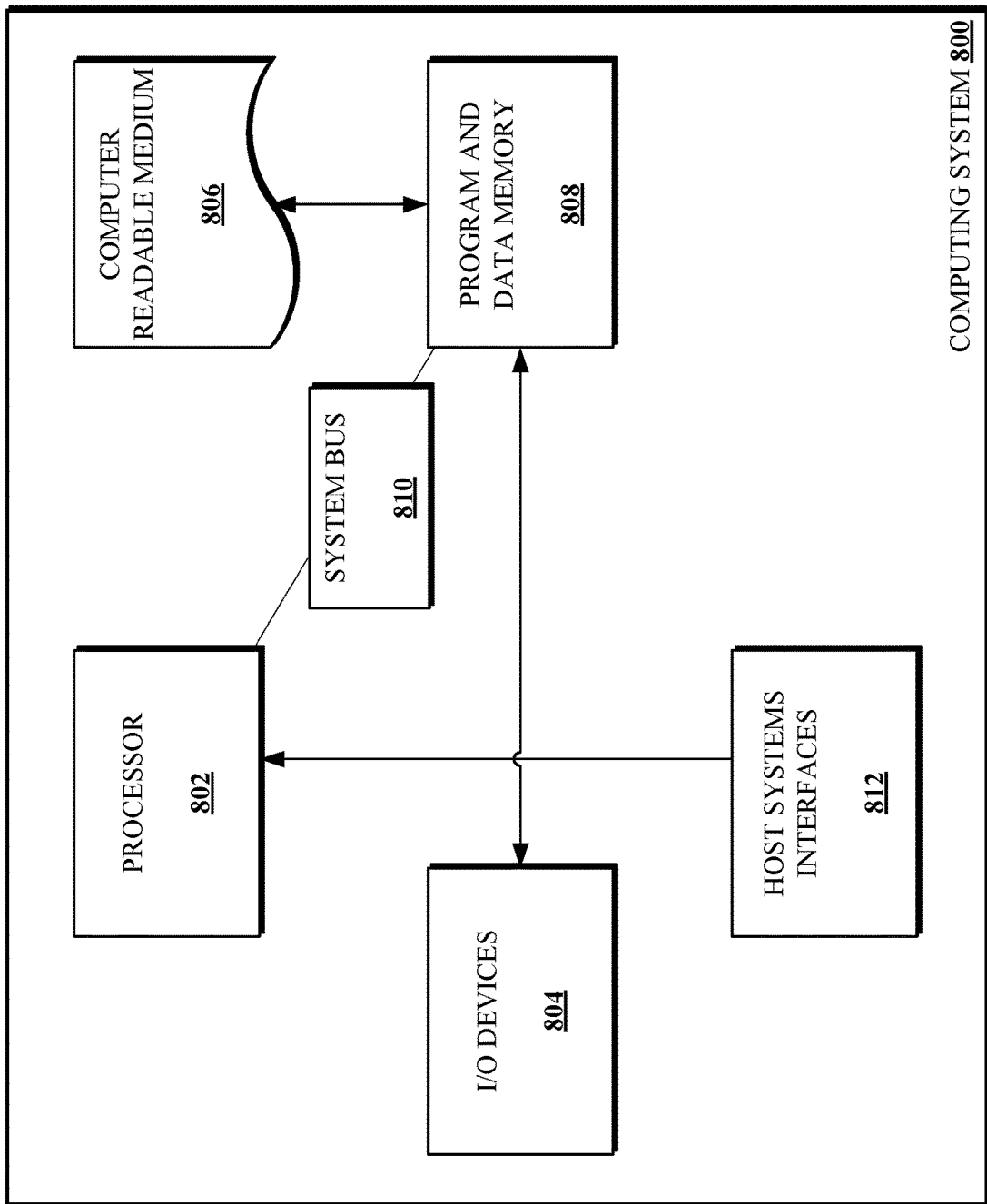
FIG. 8 shows a computing system in which a computer readable medium may provide instructions for performing any of the methods and processes disclosed herein.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 8 illustrates a computing system 800 in which a computer readable medium 806 may provide instruction for performing any methods and processes disclosed herein.

Furthermore, some aspects of the embodiments herein can take the form of a computer program product accessible from the computer readable medium 806 to provide program code for use by or in connection with a computer or any instruction execution system. For the purposes of this description, the computer readable medium 806 can be any apparatus that can tangibly store the program code for use by or in connection with the instruction execution system, apparatus, or device, including the computing system 800.

The computer readable medium 806 can be any tangible electronic, magnetic, optical, electromagnetic, infrared, or semiconductor system (or apparatus or device). Some examples of a computer readable medium 806 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 800 can include one or more processors 802 coupled directly or indirectly to a memory 808 through a system bus 810. The memory 808 can include local memory employed during actual execution of the program code, bulk storage, and/or cache memories, which provide temporary storage of at least some of the program code in order to reduce the number of times the code is retrieved from bulk storage during execution.

Input/output (I/O) devices 804 (including but not limited to keyboards, displays, pointing devices, I/O interfaces, etc.) can be coupled to the computing system 800 either directly or through intervening I/O controllers. Network adapters may also be coupled to the computing system 800 to enable the computing system 800 to couple to other data processing systems, such as through host systems interfaces 812, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, a singular or plural form can be used, but it does not limit the scope of the disclosure and the same teaching can apply to multiple objects, even if in the current application an object is referred to in its singular form.

The disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A method implemented by a virtual private network (VPN) client, comprising:
  receiving, by the VPN client, an intended network usage used for VPN server selection;
  retrieving, by the VPN client from a local storage of the VPN client, a stored association between the intended network usage and a VPN server;
  responsive to determining, by the VPN client, not to use the VPN server:
    obtaining, by the VPN client, a new VPN server from a central server;
    establishing, by the VPN client, an encrypted tunnel with the new VPN server; and
    storing, by the VPN client in the local storage of the VPN client, an updated association between the new VPN server and the intended network usage;
  encrypting a communication directed to a network server to obtain an encrypted communication; and
  transmitting the encrypted communication via the encrypted tunnel.

2. The method of claim 1, wherein determining not to use the VPN server comprises:
  determining, by the VPN client, not to use the VPN server responsive to determining that the stored association between the intended network usage and the VPN server is stale.

3. The method of claim 1, wherein determining not to use the VPN server comprises:
  determining, by the VPN client, not to use the VPN server responsive to determining that a connection cannot be established with the VPN server.

4. The method of claim 1, wherein determining not to use the VPN server comprises:
  determining, by the VPN client, not to use the VPN server responsive to receiving a request from a user to obtain the new VPN server.

5. The method of claim 1, further comprising:
  responsive to determining to use the VPN server, connecting, by the VPN client, to the VPN server.

6. The method of claim 1, wherein obtaining, by the VPN client, the new VPN server from the central server comprises:
  receiving, by the VPN client, a list of VPN servers from the central server;
  obtaining, by the VPN client, respective network data for the VPN servers; and
  transmitting, by the VPN client, the respective network data to the central server.

7. The method of claim 1, wherein the intended network usage is selected from a set comprising a gaming usage and a streaming usage.

8. A device, comprising:
  a memory; and
  a processor, the processor configured to execute instructions stored in the memory to:
    receive an intended network usage used for virtual private network (VPN) server selection;
    retrieve, from a local storage of the device, a stored association between the intended network usage and a VPN server;
    responsive to determining not to use the VPN server:
      obtain a new VPN server from a central server;
      establish an encrypted tunnel with the new VPN server; and
      store, in the local storage of the device, an updated association between the new VPN server and the intended network usage; and
    transmit a communication to a network server via the encrypted tunnel.

9. The device of claim 8, wherein the instructions to determine not to use the VPN server comprise instructions to:
  determine not to use the VPN server responsive to determining that the stored association between the intended network usage and the VPN server is stale.

10. The device of claim 8, wherein the instructions to determine not to use the VPN server comprise instructions to:
  determine not to use the VPN server responsive to determining that a connection cannot be established with the VPN server.

11. The device of claim 8, the instructions to determine not to use the VPN server comprise instructions to:
  determine not to use the VPN server responsive to receiving a request from a user to obtain the new VPN server.

12. The device of claim 8, wherein the processor is further configured to execute instructions to:
  responsive to determining to use the VPN server, connect to the VPN server.

13. The device of claim 8, wherein the instructions to obtain the new VPN server from the central server comprise instructions to:
  receive a list of VPN servers from the central server;
  obtain respective network data for the VPN servers; and
  transmit the respective network data to the central server.

14. The device of claim 8, wherein the intended network usage is selected from a set comprising a gaming usage and a streaming usage.

15. A non-transitory computer readable medium storing instructions operable to cause one or more processors of a virtual private network (VPN) client to perform operations including:
  receiving an intended network usage used for VPN server selection;
  retrieving, from a local storage of the VPN client, a stored association between the intended network usage and a VPN server;
  responsive to determining not to use the VPN server:
    obtaining a new VPN server from a central server;
    establishing an encrypted tunnel with the new VPN server; and
    storing, in the local storage of the VPN client, an updated association between the new VPN server and the intended network usage;
  encrypting a communication directed to a network server to obtain an encrypted communication; and
  transmitting the encrypted communication via the encrypted tunnel.

16. The non-transitory computer readable medium of claim 15, wherein determining not to use the VPN server comprises:

determining not to use the VPN server responsive to determining that the stored association between the intended network usage and the VPN server is stale.

17. The non-transitory computer readable medium of claim 15, wherein determining not to use the VPN server comprises:
determining not to use the VPN server responsive to determining that a connection cannot be established with the VPN server.

18. The non-transitory computer readable medium of claim 15, wherein determining not to use the VPN server comprises:
determining not to use the VPN server responsive to receiving a request from a user to obtain the new VPN server.

19. The non-transitory computer readable medium of claim 15, further comprising:
responsive to determining to use the VPN server, connecting to the VPN server.

20. The non-transitory computer readable medium of claim 15, wherein obtaining the new VPN server from the central server comprises:
receiving a list of VPN servers from the central server;
obtaining respective network data for the VPN servers; and
transmitting the respective network data to the central server.

* * * * *